United States Patent [19]
Mori et al.

[11] Patent Number: 5,218,620
[45] Date of Patent: Jun. 8, 1993

[54] SPREAD SPECTRUM COMMUNICATION DEVICE

[75] Inventors: Masaharu Mori; Motohiro Gochi; Shigeru Takeuchi, all of Tokyo, Japan

[73] Assignee: Clarion Co., Ltd., Tokyo, Japan

[21] Appl. No.: 852,578

[22] Filed: Mar. 17, 1992

[51] Int. Cl.[5] .................. H04L 27/32; H04L 7/06
[52] U.S. Cl. ........................... 375/1; 375/113; 375/115
[58] Field of Search ................ 375/1, 113, 115

[56] References Cited

U.S. PATENT DOCUMENTS

| 4,560,984 | 12/1985 | Scholl | 375/113 X |
| 4,860,307 | 8/1989 | Nakayama | 375/1 |
| 5,022,046 | 6/1991 | Morrow, Jr. | 375/1 |
| 5,048,052 | 9/1991 | Hamatsu et al. | |
| 5,058,128 | 10/1991 | Kurihara et al. | 375/1 |
| 5,090,023 | 2/1992 | Watanabe et al. | 375/1 |
| 5,093,840 | 3/1992 | Schilling | 375/1 |
| 5,105,436 | 4/1992 | Mori et al. | |
| 5,128,957 | 7/1992 | Nakagawa | 375/1 |

FOREIGN PATENT DOCUMENTS

| 64-11178 | 8/1983 | Japan . |
| 1-98338 | 4/1989 | Japan . |
| 1-98340 | 4/1989 | Japan . |
| 1-109925 | 4/1989 | Japan . |

OTHER PUBLICATIONS

Masaharu Mori et al., "A Method of Code Synchronization in a Spread Spectrum Receiver using a SAW Convolver", Journal of Electronic Communication Society of Japan, 86/4, vol. J69-B No. 4, pp. 403-405. (No translation).

Primary Examiner—Gilberto Barrón, Jr.
Attorney, Agent, or Firm—Flynn, Thiel, Boutell & Tanis

[57] ABSTRACT

In a spread spectrum communication system for communicating data by spreading spectrum thereof, using PN codes, on the transmitter side, a first modulated output portion, which is spread-spectrum-modulated, containing no data to be transmitted and a second modulated output portion, which is spread-spectrum-modulated, following the first modulated output portion and containing data to be transmitted are generated; and the second modulated output portion is transmitted with a low electric power and the first modulated output portion with a high electric power. On the receiver side, a correlation-demodulated output is generated by correlation-demodulating a received input; and from the correlation-demodulated output consisting of a first correlation-demodulated output portion corresponding to the first modulated output portion and a second correlation-demodulated output portion corresponding to the second modulated output portion the first correlation-demodulated output portion is detected. Further timing signal serving as a reference for an operation on the receiver side is generated, starting from the first correlation-demodulated output portion.

12 Claims, 19 Drawing Sheets

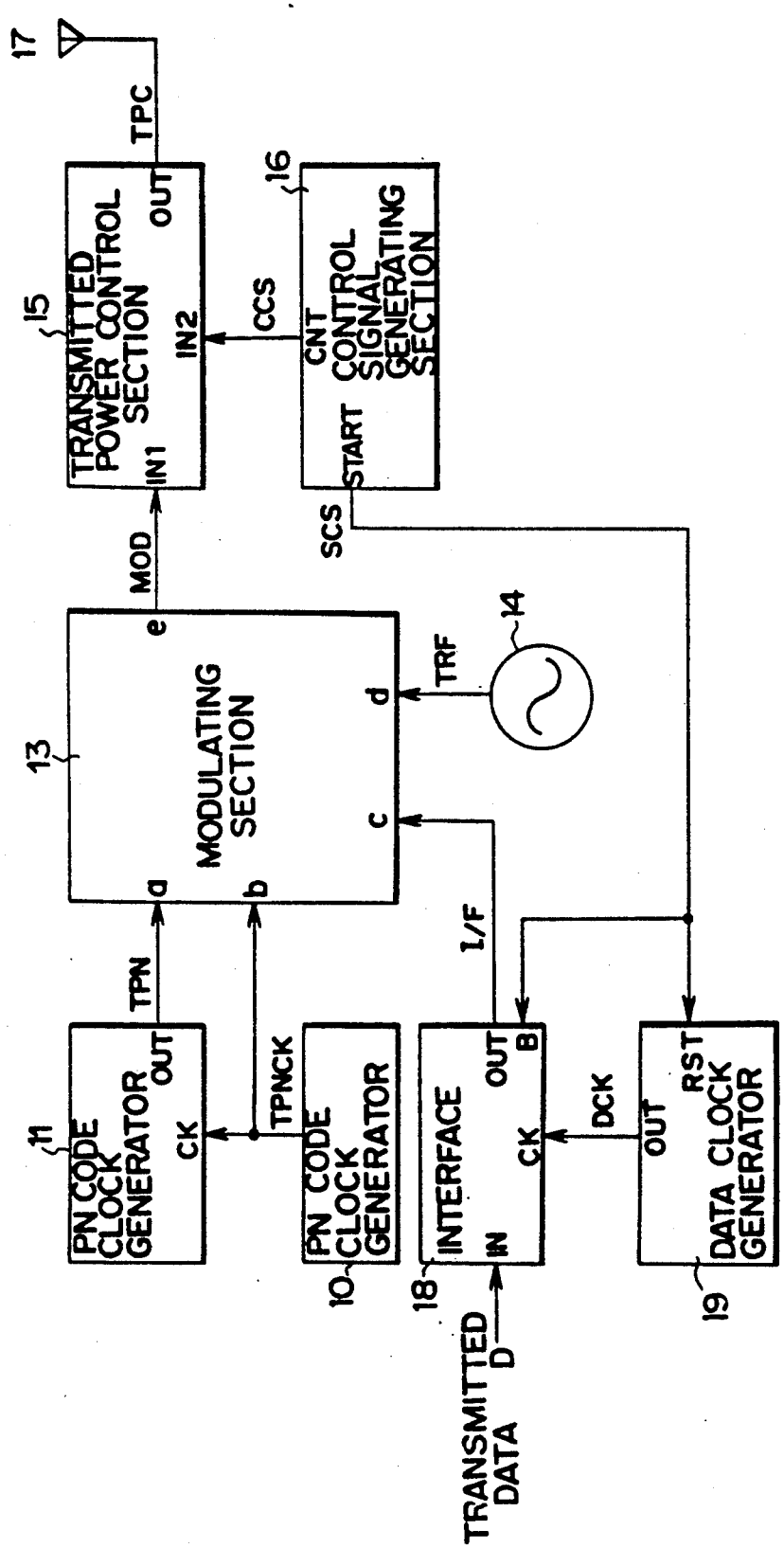

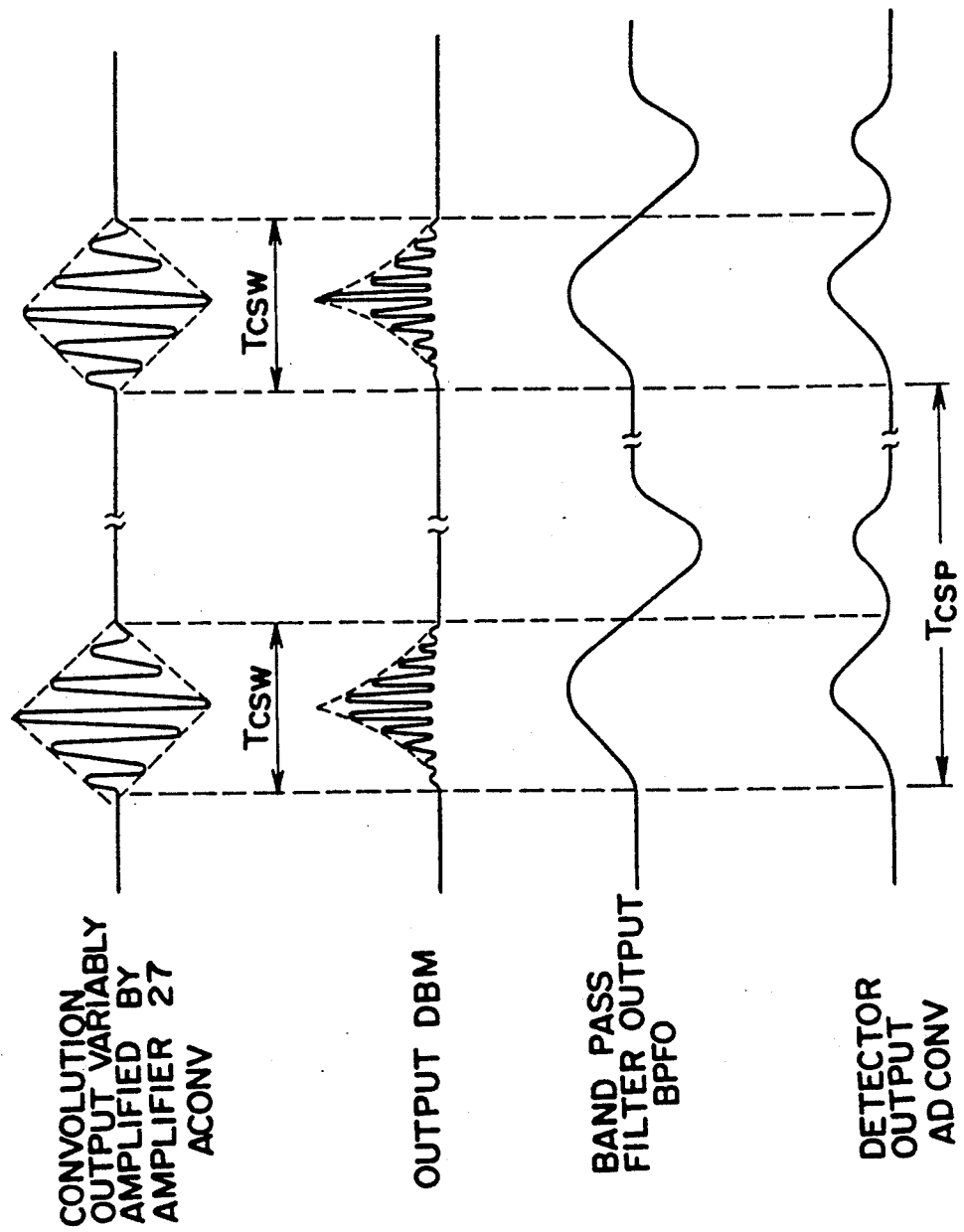

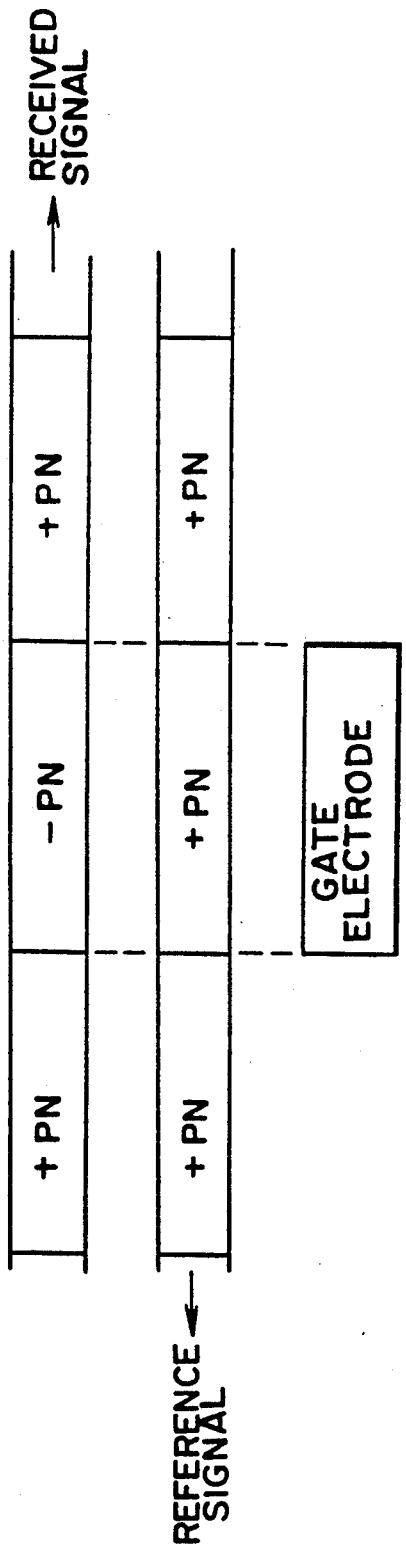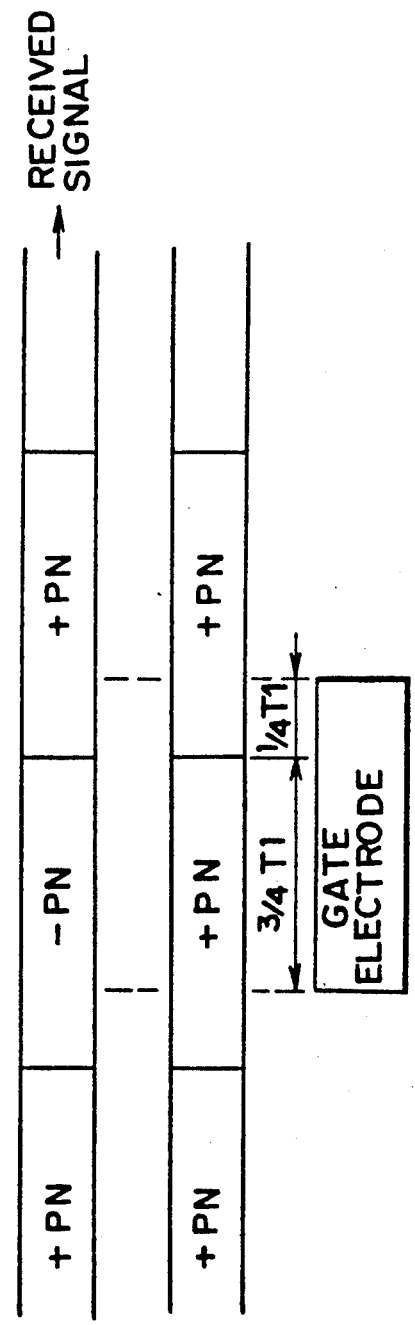

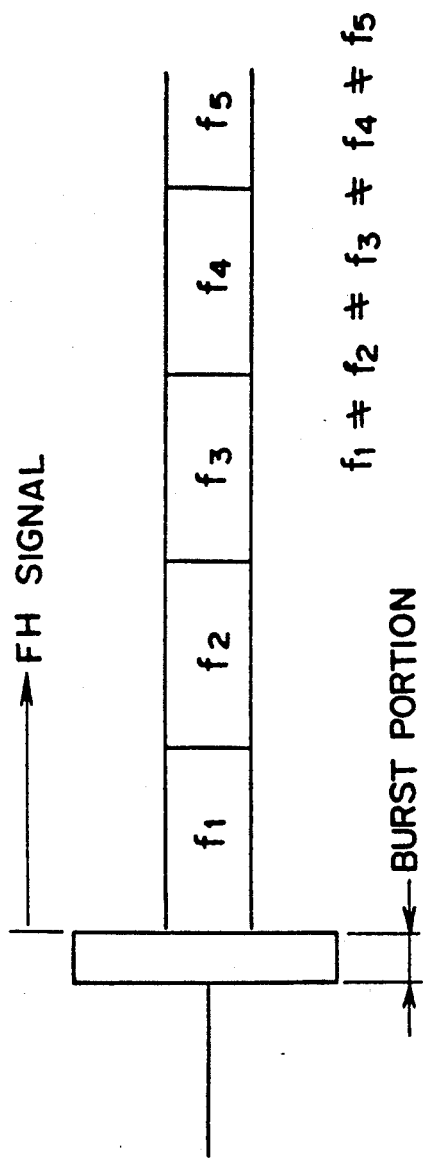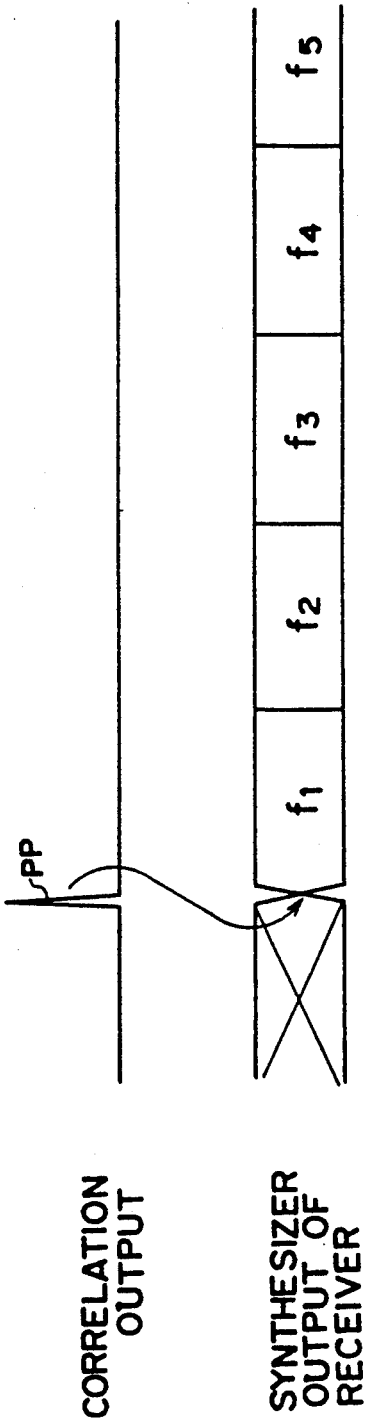

SPREAD SPECTRUM COMMUNICATION DEVICE

FIELD OF THE INVENTION

The present invention relates to a method of the spread spectrum modulation communication used in digital data communication and a device for realizing same.

BACKGROUND OF THE INVENTION

The spread spectrum communication method is characterized in that it is strong against disturbance, noise and fading and has properties of concealing signals and secrecy and that asynchronous random access can be effected thereby, as described in "Spread Spectrum Systems" by R. C. Dixon. By this spread spectrum communication method, the initial synchronization (by which the synchronization between a PN code train contained in a received signal and a PN code train formed within a receiver is established with a high speed) and the synchronization holding (by which the synchronization is held stably) are necessary.

As an example of means for giving the initial synchronization described above, there is means disclosed in:
Literature 1: JP-B-Sho 64-11178
and on the other hand, as an example of means for giving the synchronization holding, there is known
Literature 2: Journal of Electronic Communication Society of Japan, 86/4 Vol. J69-B No. 4 pp. 403–405.

The means disclosed in Literature 1 concerning the initial synchronization is of type, by which a convolver is used as a correlation demodulator for the receiver As it can be seen from a circuit of the receiver indicated in FIG. 5, in order to have the initial synchronization of the reference PN code train, time difference between the starting point of the reference PN code train and the starting point of the convolver output is measured; phase difference between the PN code train contained in the received signal and the reference PN code train is obtained from this time difference; and the phase of the reference PN code train is regulated so that this phase difference is removed.

The means disclosed in Literature 2 concerning to the synchronization holding is similarly of type, by which a convolver is used as a correlation demodulator for the receiver. As clearly seen from block diagrams of a transmitter and a receiver indicated in FIGS. 1A and 1B, respectively, it is characterized in that the phase difference between the PN code train contained in the received signal and the reference PN code train is converged to zero by initializing the phase of the reference PN code train in the correlation output.

Although the two methods for realizing the initial synchronization and the synchronization holding described above are useful in principle, in the case where they were used in a practical wireless propagation path, they had inconveniences that
a. the correlation output cannot be caught because of influences of noise and disturbance at effecting the initial synchronization;
b. erroneous operations can be produced by a correlator output other than the aimed signal; etc. This is true also for the synchronization holding operation.

Therefore an example of improvement of the initializing operation is disclosed in;
Literature 3: JP-A-Hei 1-98338
and an example of improvement of the synchronization holding is disclosed in;
Literature 4: JP-A-Hei 1-98340.

In Literature 3 stated above, an initial synchronization pattern and a pattern for detecting information data start timing are included in transmitted data, and the output of the correlator is led to pattern judging means (i.e. matching filter) in order to assure further the initial synchronization operation, as shown by the circuit of the receiver indicated in FIG. 1B, so that influences of noise, etc. are reduced in this way. On the other hand, in Literature 4 concerning the synchronization holding stated above, it is intended to reduce the influences of noise, etc. on the data demodulating operation by reducing the influences of noise on the synchronization operation by means of a digital filter (i.e. matching filter) and at the same time observing only the output of the correlator at the neighborhood of the point of time of the output of the aimed signal by using a window pulse.

However the devices disclosed in Literatures 3 and 4 had problematical points as follows;
a. the circuit is complicated, because the patter judging means, the digital filter, etc. are necessary;
b. no satisfactory effect can be obtained, in the case where a threshold voltage for comparison used at forming two-valued data, because both the pattern judging means and the digital filter perform processing after the output of the correlator has been converted into two-valued data;
c. since processing time by the pattern judging means should be increased in order to increase the effect of the means disclosed in Literature 3, as the result increase in the time required for the initial synchronization produced; etc.

OBJECT OF THE INVENTION

Consequently a first object of the present invention is to provide a method of the spread spectrum modulation communication capable of realizing surer catch-up of the correlation output and the signal synchronization necessary for data demodulation by means of a simple circuit and a system for realizing same.

Further, in the spread spectrum modulation communication, heretofore, it was a problem to be solved to provide a modulating-demodulating method suitable for this communication method.

For this reason, the applicant of this application has proposed new data modulating-demodulating methods in his two older patent applications, Nos. Hei 1-29538 and Hei 1-244931. By the data modulating-demodulating method according to the former patent application, as indicated in FIGS. 1 and 2 thereof, on the transmitter side a plurality of PN codes different from each other are switched-over according to values of relevant data bits to form a spread spectrum code, which is then transmitted, and on the receiver side an SAW convolver is used for the correlator so that data demodulation can be effected without requiring any synchronization between the PN code contained in the received signal and the reference PN code within the receiver. Further the device described in this patent application, as indicated in FIG. 9 thereof, is so constructed that the reference PN code tracks the PN code contained in the received signal and it is devised to obtain always the correlation output. On the other hand the latter patent application described above (No. Hei 1-244931) represents an improvement of the former patent application.

In the latter patent application, as indicated in FIG. 1 thereof, a pattern matching circuit and/or a low pass filter are added to the correlator on the output side thereof to reduce influences of noise and disturbance and in this way the detection of the presence or absence of the correlation output is effected more surely so that the tracking method, by which 2 PN codes are switched-over at detecting disappearance of the correlation output, is effected more efficiently.

However, in the latter patent application (i.e. patent application No. Hei 1-244931), if performance of the added circuits is raised, in-loop-delay in the tracking loop is increased and thus misstracking can take place. Therefore it was difficult to obtain performance over a certain degree. Furthermore, if the in-loop-delay is increased, the period of time of the disappearance of the correlation output is elongated. This had bad influences on the circuit generating a threshold voltage for comparison, when the output of the correlator is converted into two-valued data.

Therefore a second object of the present invention is to provide a method of the spread spectrum modulation communication capable of making more surely the data demodulation possible without using any tracking loop and a system for realizing same.

Still further, in the spread spectrum communication, it is necessary to control suitably the gain of an amplifier before the correlator in the receiver and an amplifier on the output side of the correlator.

An example of the prior art method for this gain control is indicated in;
Literature 5: JP-A-Hei 1-109925.
The device disclosed therein is so constructed that, as clearly seen from FIG. 1 thereof, the output of the correlator is demodulated; the output thus demodulated is compared with a reference voltage; and the gain of a variable gain amplifier connected with the correlator on the output side is controlled on the basis of a result of this comparison. However, since this constitutes a negative feed back amplifier so that the demodulated output is kept to be constant, in the case where noise and disturbance are intense and noise, etc. are predominant also in the output of the correlator, the noise, etc. act so as to decrease the gain. This was not preferable for the data demodulation.

Therefore a third object of the present invention is to provide a method of the spread spectrum modulation communication having a gain control for assuring the gain necessary for the data demodulation, even in the case where noise and disturbance are predominant in the output of the correlator, and for making the device so as not to judge erroneously for those noise, etc. to be an aimed signal, in the case where there exists no aimed signal, and a system for realizing same.

SUMMARY OF THE INVENTION

In order to achieve the above first object, a spread spectrum communication method according to the present invention is characterized in that, on the transmitter side, a) a spread-spectrum-modulated output consisting of a first modulated output portion, which is spread-spectrum-modulated, containing no data to be transmitted and a second modulated output portion, which is spread-spectrum-modulated, following said first modulated output portion and containing data to be transmitted is generated; and b) the spread-spectrum-modulated output is transmitted so as to transmit the second modulated output portion with a low electric power and the first modulated output portion with a high electric power; and on the receiver side, a) a received input is correlation-demodulated to generate a correlation-demodulated output; b) from the correlation-demodulated output consisting of a first correlation-demodulated output portion corresponding to the first modulated output portion and a second correlation-demodulated output portion corresponding to the second modulated output portion the first correlation-demodulated output portion is detected; and c) a timing signal serving as a reference for an operation on the receiver side is generated, starting from the first correlation-demodulated output portion.

In order to achieve the above second object, a spread spectrum communication method according to the present invention is characterized in that, on the transmitter side, a) a first PN code train consisting of a repetition of first PN codes with a predetermined period and a second PN code train shifted by a predetermined phase with respect to the first PN codes is generated; and b) a spread-spectrum-modulated output is generated by selecting either one of the first and the second PN code train according to each bit of the data to be transmitted so that each bit of the transmitted data is CPSK-modulated; and on the receiver side, a) a correlation-demodulated output is generated by correlation-demodulating a received input with a third PN code train consisting of a repetition of second PN codes inverted in time with respect to the first PN code with the predetermined period; and b) the correlation-demodulated output is CPSK-modulated. This CPSK-modulation is effected i) by generating a first time window pulse train consisting of a pulse train with a period, which is a half of the predetermined period, in synchronism with the correlation-demodulated output, a second time window pulse train consisting of a pulse train shifted by a predetermined phase with respect to the pulse train stated previously, and a bit duration specifying signal indicating a duration of each bit of the transmitted data; ii) by generating a two-valued pulse output obtained by converting the correlation-demodulated output with a predetermined threshold; iii) by detecting a difference between a number of pulses within the first time window and a number of pulses within the second time window in the two-valued pulse output in the duration of each bit; and iv) by determining a state of the each bit, depending on a polarity of the difference.

In order to achieve the above third object, a spread spectrum communication method according to the present invention is characterized in that, on the transmitter side, a) a spread-spectrum-modulated output consisting of a first modulated output portion, which is spread-spectrum-modulated, and a second modulated output portion, which is spread-spectrum-modulated, following said first modulated output portion is generated; b) the spread-spectrum-modulated output is transmitted so as to transmit the second modulated output portion with a low electric power and the first modulated output portion with a high electric power; and on the receiver side, a) a gain in a path from reception to generation of the correlation-modulated output of the received input is set at a low level; b) from the correlation-demodulated output consisting of a first correlation-demodulated output portion corresponding to the first modulated output portion and a second correlation-demodulated output portion corresponding to the second modulated output portion an end of the first correlation-demodulated output portion is detected; and c)

the gain in the path is set at a high level at the detection of the end.

BRIEF DESCRIPTION OF THE DRAWINGS

FIGS. 1A and 1B are block diagrams of a transmitter and a receiver, respectively, used for the spread spectrum modulation communication according to the present invention;

FIG. 13 shows waveforms at different parts in the circuit indicated in FIG. 12;

FIGS. 17A and 17B are diagrams for explaining the necessity of the synchronization among a received signal, a reference signal and the gate electrode of the convolver; and FIGS. 18A, 18B and 18C are diagrams showing another embodiment, in which burst transmission and reception according to the present invention is applied to a frequency hopping (FH) type spread spectrum modulation communication.

DETAILED DESCRIPTION

Now the present invention will be explained in detail, using an embodiment. Although in the embodiment described below the present invention is applied to a direct sequence (DS) spread spectrum modulation communication, the present invention can be applied as well to a frequency hopping (FH) type spread spectrum modulation communication.

Figure 1B:
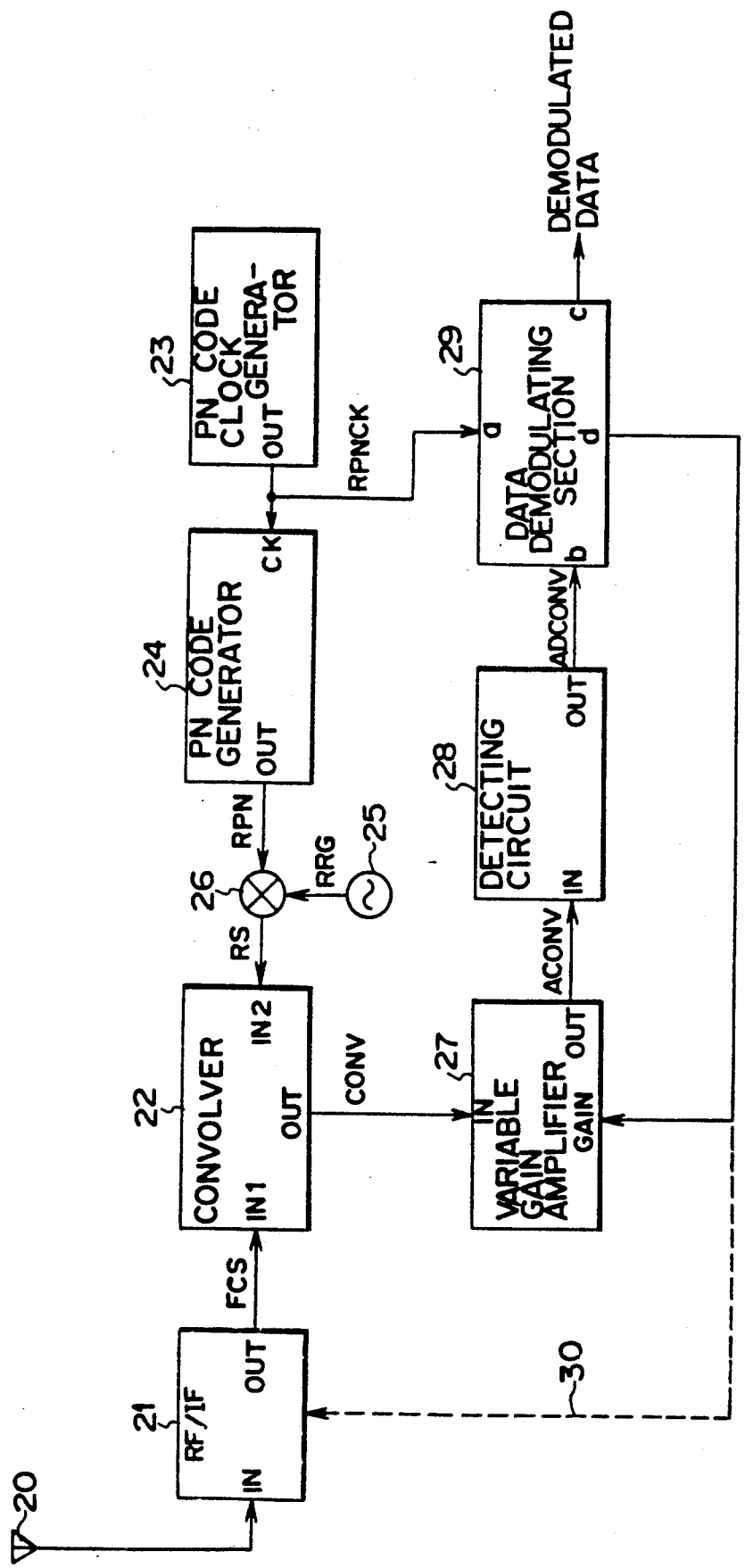

FIGS. 1A and 1B are block diagrams of a transmitter 1 and a receiver 2, respectively, used for the spread spectrum modulation communication according to the present invention.

Transmitter 1

At first the transmitter 1 will be explained. The whole construction consists of a PN code clock generator 10; a PN code generator 11; a modulating section 13; a high frequency generator 14; a transmission power control section 15; a control signal generator 16; a transmitting antenna 17; an interface section 18; and a data clock generator 19.

Figure 4:
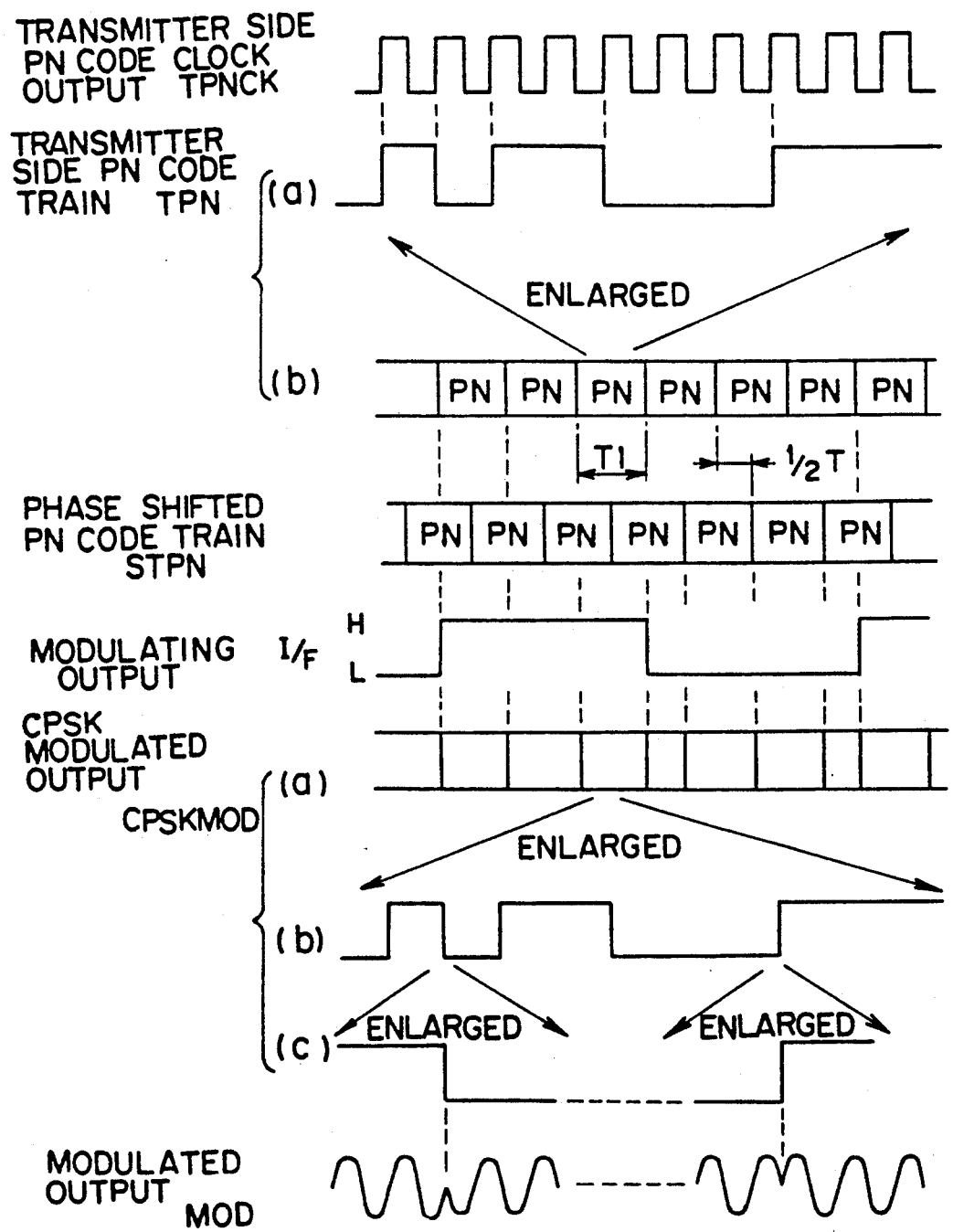
FIG. 4 shows waveforms at different parts in the circuit of the modulating section indicated in FIG. 3.

The clock generator 10 generates a TPNCK clock having a frequency fl for the transmitter side PN clock as indicated in FIG. 4. The PN code generator 11 receiving this clock output TPNCK at a CK terminal thereof generates a PN code train having a period T1 at an output terminal OUT thereof.

Figure 2A:
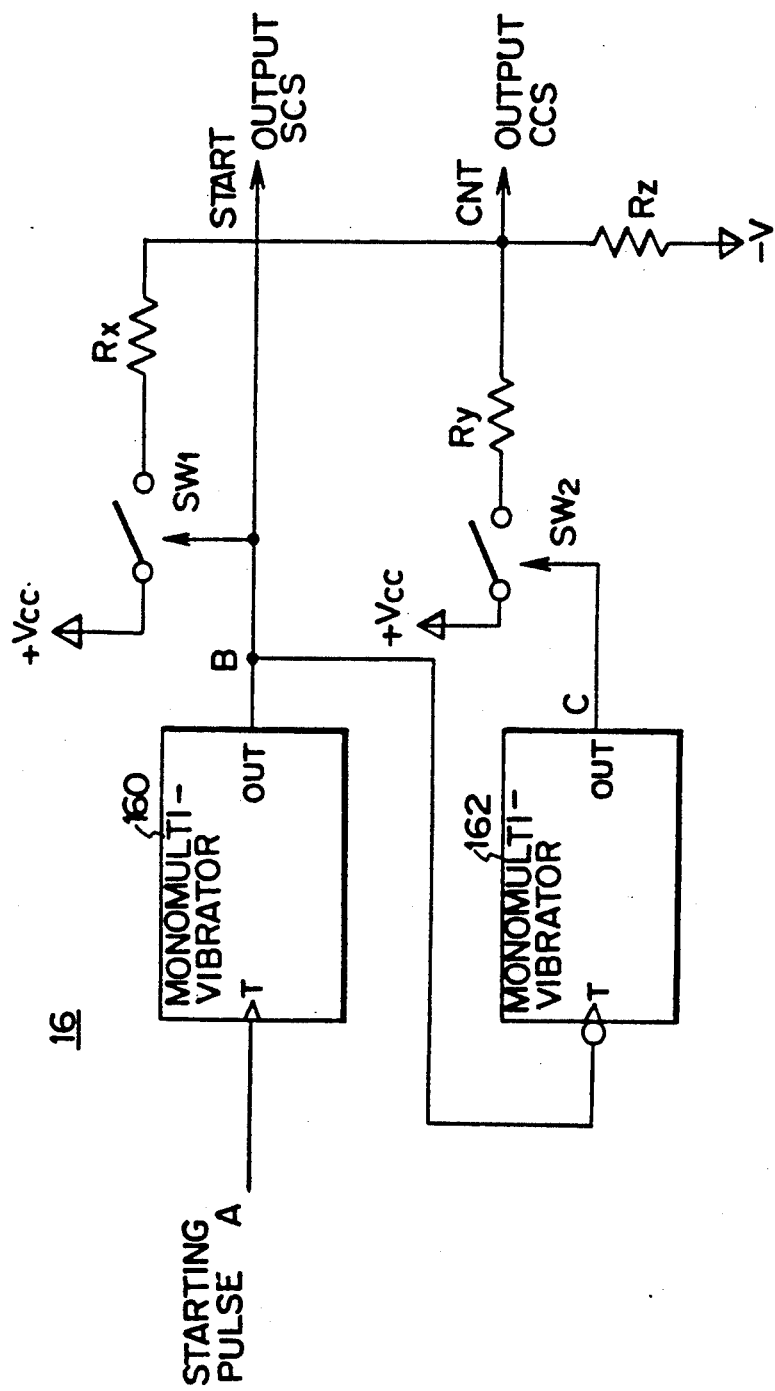
FIG. 2A is a circuit diagram showing in detail a circuit of a control signal generating section 16 for determining a transmission format (packet) for the transmitter indicated in FIG. 1A.
Figure 2B:
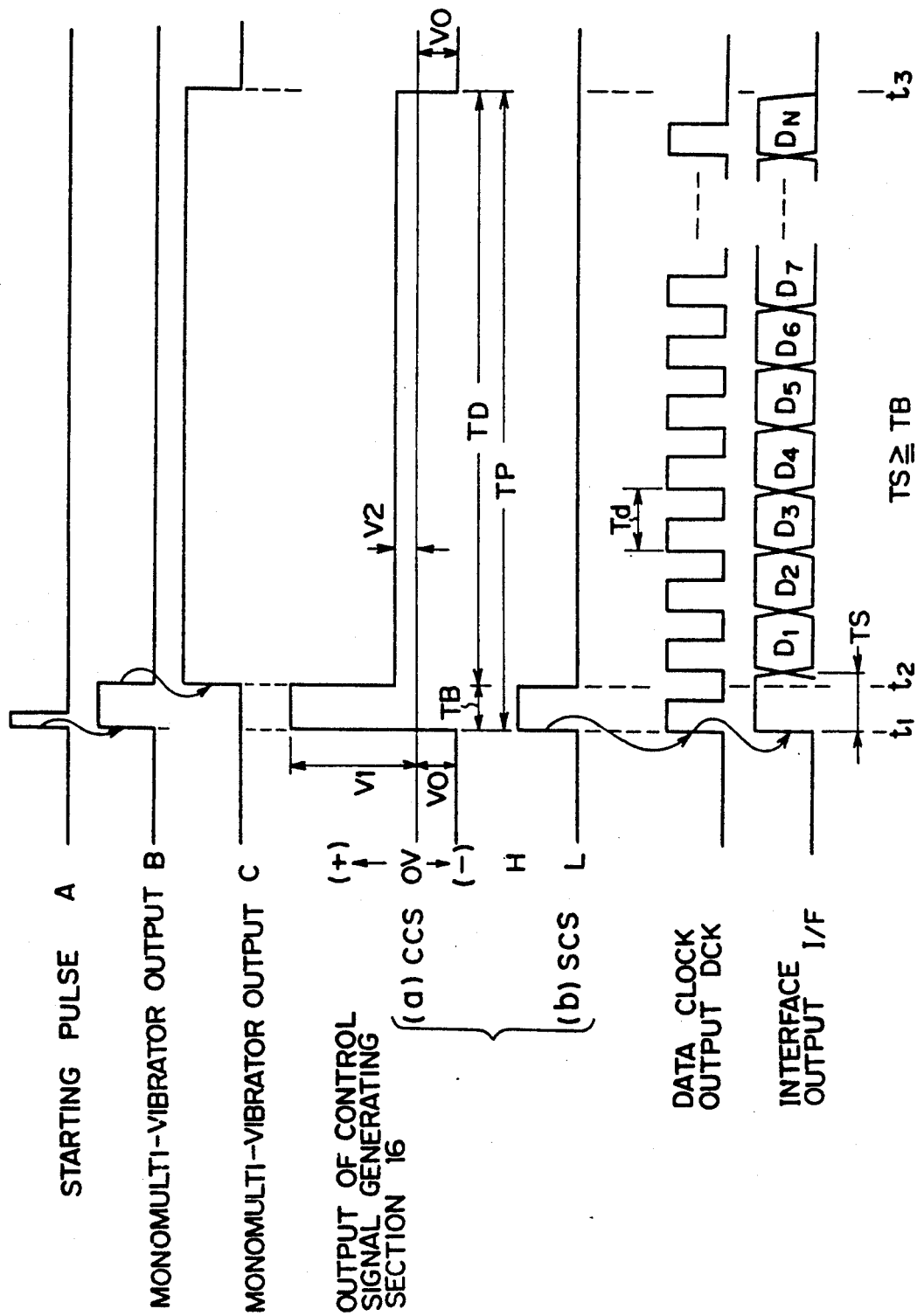
FIG. 2B shows waveforms at different parts in the circuit indicated in FIG. 2A.

Here a format of the data transmission for the transmitter 1 will be explained, referring to FIG. 2B. The transmission format relating to the burst transmission, which is one of the characteristics of the present invention, has a packet form including a burst portion containing no data and a data portion containing data to be transmitted. The control signal generating section 16 works so as to determine the duration of each packet. An example of that circuit consists of two monomultivibrators 160 and 162, two analogue switches SW1 and SW2 (each of the switches being turned-on, when the control input B or C is high), and three resistors Rx, Ry and Rz (Rx<Ry). In this circuit 16, pulses A, B and C can be generated also by a micro-computer. Owing to such a circuit, the control signal generating section 16 generates a control output CCS at a control terminal CNT and a start control output SCS at a start terminal START. The voltage of the output CCS at the control terminal has a positive high value (+V1) in a short period of time from t1 to t2, i.e. burst period TB (e.g.: 9 μs) and a positive lower value (+V2) in a succeeding period of time from t2 to t3, i.e. data period TD (e.g.: 100 ms), as indicated in FIG. 2B. When this packet period of time TP is terminated, it has a same negative value (−V0) as before the start. The other output SCS of the generating section 16 indicates the burst period in the packet and it is high only in that period TB.

Next, a section, which forms a modulating signal, responding to the output SCS, will be explained. At first, the data clock generator 19 receiving the output SCS at a reset terminal RST generates a data clock DCK having a period Td synchronized with the front edge of the pulse of the output SCS (i.e. initialized) at the output terminal OUT, similarly as indicated in FIG. 2B. This initialization is necessary for synchronizing the data clock on the receiver side with a detected burst portion in the receiver 2. The period Td determines the duration of each bit of the transmitted data D. The interface 18, which receives the clock DCK at a clock terminal CK, the output SCS at a terminal B and the transmitted data D at an input terminal IN, outputs an output I/F, which is forcedly set at a level corresponding to the high level of the data in the present embodiment during a starting period TS selected so as to be longer than the burst period TB and includes different bits D1, D2~DN of the data with the period Td after this period of time TS. This output I/F acts as a modulating signal. (It is necessary to know to which data level the forced setting level during the starting period TS corresponds, when the part corresponding to the burst portion is judged, in the correlation output of the receiver 2. For this reason, the forced setting level can be a low level, if it is made correspond to an operation on the receiver side. Further, if differential coding, which is a well-known technique, is used, such a forced setting operation is unnecessary, and even if the polarity of the CPSK-demodulated output of the receiver, described later, is inverted, correct data reproduction is made possible by effecting a post differential decoding.)

Next the modulating section 13 effecting the CPSK (code phase shift keying), which is one of the characteristics of the present invention, will be described. As it can be seen from FIG. 1A, the modulating section 13 is constructed so as to receive a PN code train TPN at an "a" terminal, a clock output TPNCK at a "b" terminal, a modulating output I/F at a "c" terminal, and a high frequency TRF from the high frequency generator 14 at a "d" terminal and to generate a modulated output MOD thereof at an "e" terminal.

Figure 3:
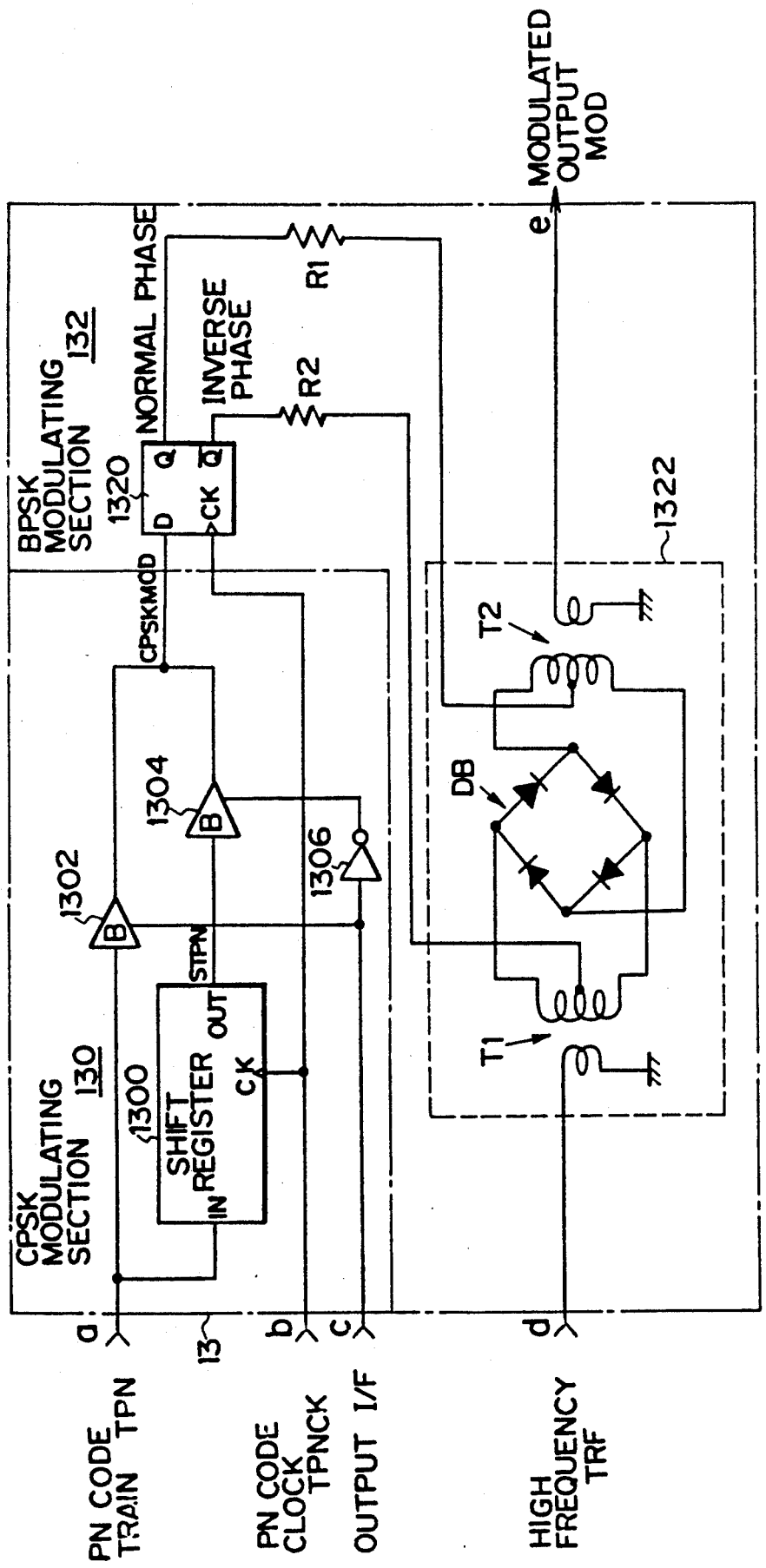
FIG. 3 is a circuit diagram showing in detail a circuit of a modulating section in the transmitter indicated in FIG. 1A.

A detailed circuit of this modulating section 13 will be explained, referring to FIGS. 3 and 4. As indicated in FIG. 3, the modulating section 13 is provided with a CPSK modulating section 130 and a BPSK (biphase shift keying) modulating section 132. At first, the CPSK modulating section 130 is provided with a shift register 1300, two three-state buffers 1302 and 1304 and an inverter 1306. The buffer 1302 receives the PN code train TPN and the state thereof is controlled by the output I/F. The shift register 300 receives the PN code train TPN at an input terminal IN and a clock TPNCK at a clock terminal CK and as indicated in FIG. 4, it generates a phase shifted PN code train STPN obtained by delaying the input by ½ of the period T1, i.e. a phase of 180°, at an output terminal OUT. This delay amount (½ of T1) in the shift register is preferable, because the greatest phase difference can be obtained by using it, in the case where the CPSK-modulation is carried out, and therefore erroneous judgment of the phase can be minimized at demodulation on the receiver side. However it is possible also to change this delay amount. Next the state of the buffer receiving the output STPN is controlled by the output I/F through the inverter 1306. Consequently, as indicated in FIG. 4, the buffer 1302 makes the PN code train TPN pass through, as long as the output I/F is high, while the buffer 1304 makes the phase shifted PN code train STPN pass through, as long as the output I/F is low. In this way a CPSK modulated output CPSKMOD is formed. At this modulation, since the frequency f1 of the PN code clock TPNCK is selected so as to by very high with respect to the frequency f2 of the data clock DCK, the spectrum of the I/F output is spread in the modulated output CPSKMOD (spread spectrum modulation).

The succeeding BPSK modulating section 132 consists of a D-type flipflop (F/F) 1320, two resistors R1 and R2, and a double balanced modulator 1322. More in detail, the D-type F/F 1320 receives a modulated output CPSKMOD at a D terminal, a clock TPNCK at a CK terminal, and outputs a normal phase output at a Q terminal and an inverted phase output at a Q* terminal (* indicating inversion) to differential-drive the modulator 1322 receiving the high frequency TRF by these two outputs. As indicated in the figure, the modulator 1322 is provided with two transformers T1 and T2 and a diode bridge DB and generates an output calculated by multiplying the high frequency by the output CPSKMOD as a double balanced modulated output and therefore the final modulated output MOD of the modulating section 13.

Figure 5:
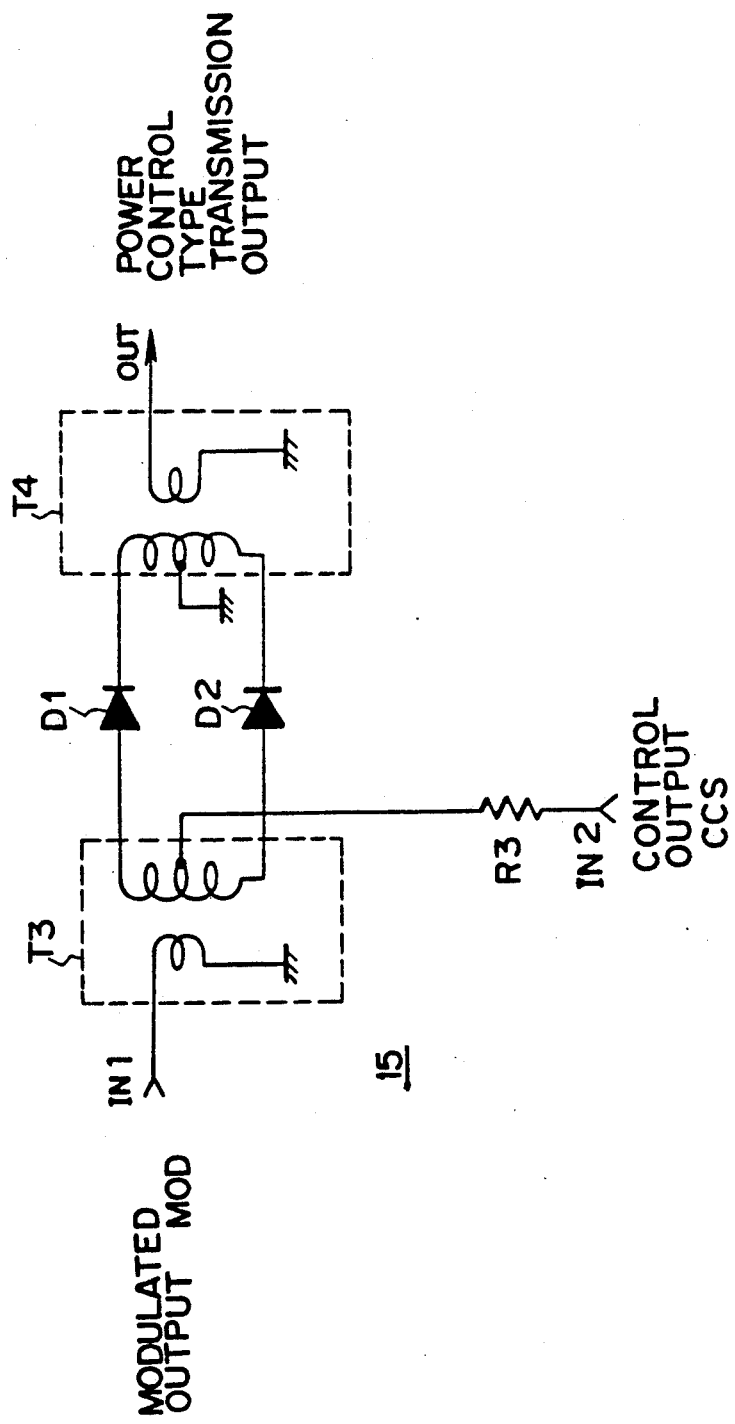
FIG. 5 is a circuit diagram showing in detail a circuit of a transmission power control section 15 in the transmitter indicated in FIG. 1A.

Next the transmission power control section 15 transmitting this modulated output will be explained. This control section is a part relating to the burst transmission, which is one of the characteristics of the present invention, and it receives the modulated output MOD at an input terminal IN1 and the output CCS of the control signal generating section 16 at the other input terminal IN2 to supply a power control type transmission output TPC from the output OUT to the antenna 17. As indicated in FIG. 5, the detailed circuit thereof consists of two transformers T3 and T4, two diodes D1 and D2 and one resistor R3. One end of the primary winding of the transformer T3 is coupled with the modulated output MOD and the other end thereof is grounded, while the center tap of the secondary winding thereof is coupled with the control output CCS through the resistor R3 and further the two ends thereof are connected with the two ends of the primary winding of the other transformer T4 through the diodes D1 and D2, respectively (the center tap thereof being grounded). One end of the secondary winding of this transformer T4 is grounded and the other end thereof is connected with the output terminal OUT. This circuit functions so as to amplitude-modulate the modulated output MOD with the control output CCS. Since the high frequency resistance of the diodes D1 and D2 decreases, as the voltage of the control output CCS increases positively, an output having a great amplitude is generated at the OUT terminal.

Figure 6:
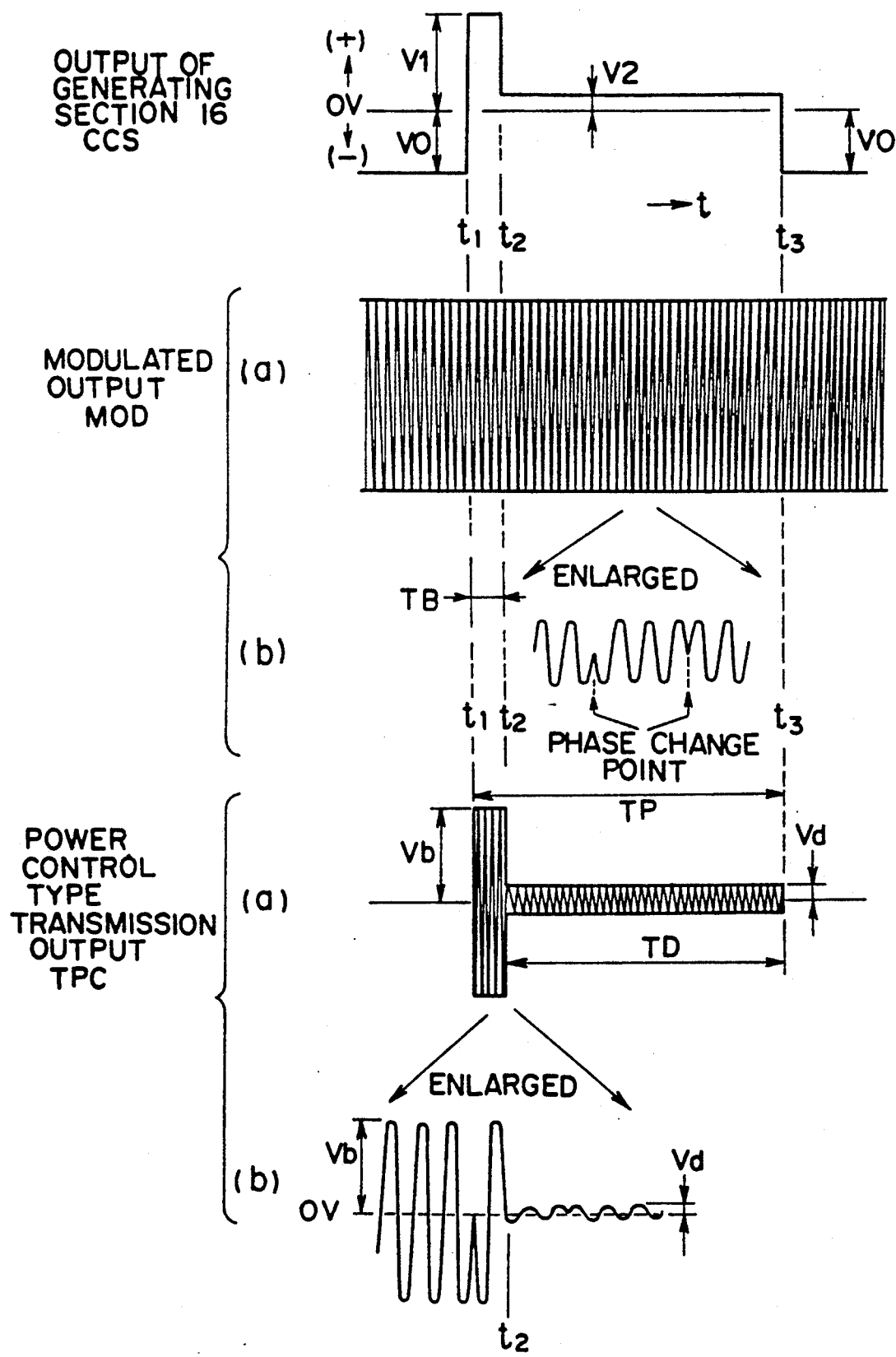
FIG. 6 shows waveforms at different parts in the circuit indicated in FIG. 5.

Consequently, as indicated in the diagrams representing waveforms in FIG. 6, because of the high voltage +V1 of the control output CCS during the burst period TB, the transmission output TPC has a great amplitude, which is Vb (e.g. the peak electric power of the burst part being 1 mW). On the contrary, during the data period TD, since the control output CCS has the low voltage +V2, the transmission output TPC has a small amplitude Vd (e.g. the average electric power of the data part being 10 μW). Outside of the packet period TP the transmission output TPC is extremely small or zero.

In the transmitter 1 as described above, it is necessary to select the duration of the burst period, relating it with the processing time of the correlator used in the receiver 2. Denoting the processing time of the correlator by T, it is preferable to select the duration of the burst period so that it satisfies;

$$TB \geq 1.5T$$

In the case where an SAW convolver is used for the correlator, the processing time T is determined by the gate length thereof.

Receiver 2

Now the receiver 2 will be explained.

As indicated in FIG. 1B, the receiver 2 consists of RF/IF (high frequency amplification, frequency conversion, intermediate frequency amplification) section 21; an SAW convolver 22 acting as the correlator; a reference signal generating section including a receiver side PN code clock generator 23, a receiver side PN code generator 24, a high frequency generator 25 and a double balanced modulator 26; a variable gain amplifier 27; a detecting circuit 28; and a data demodulating section 29. The circuits 22 to 28 constitute correlation demodulating means.

More in detail, the clock generator 23 generates a clock output RPNCK having the same clock frequency f1 as the clock for the transmitter side PN code and the generator 24 receiving it at a CK terminal outputs a PN code train RPN inverted in time with respect to the transmitter side PN code. The modulator 26 receiving this output is connected so as to receive a high frequency output RPG having the central frequency of a frequency converted received signal FCS from the high frequency generator 25 as another input. The double balanced modulator 26 modulates a high frequency RPG with the PN code train RPN to form a reference signal RS used by the convolver 22.

Figure 7:
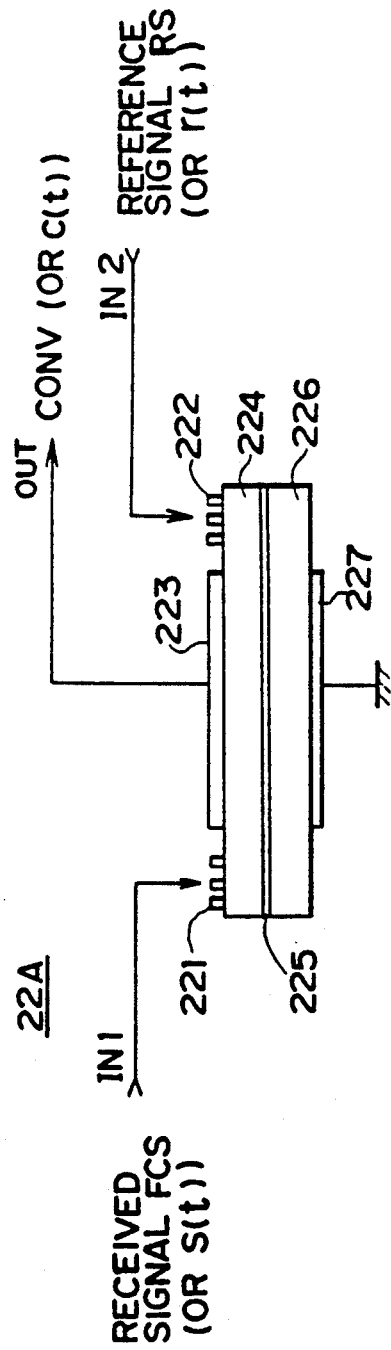
FIG. 7 is a diagram showing the construction of a convolver 22 in the receiver indicated in FIG. 1B.
Figure 9:
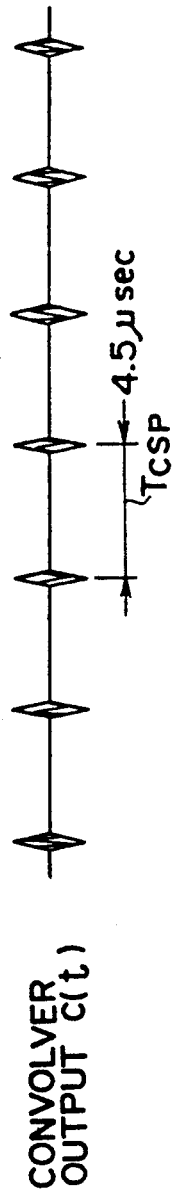
Figure 8A:
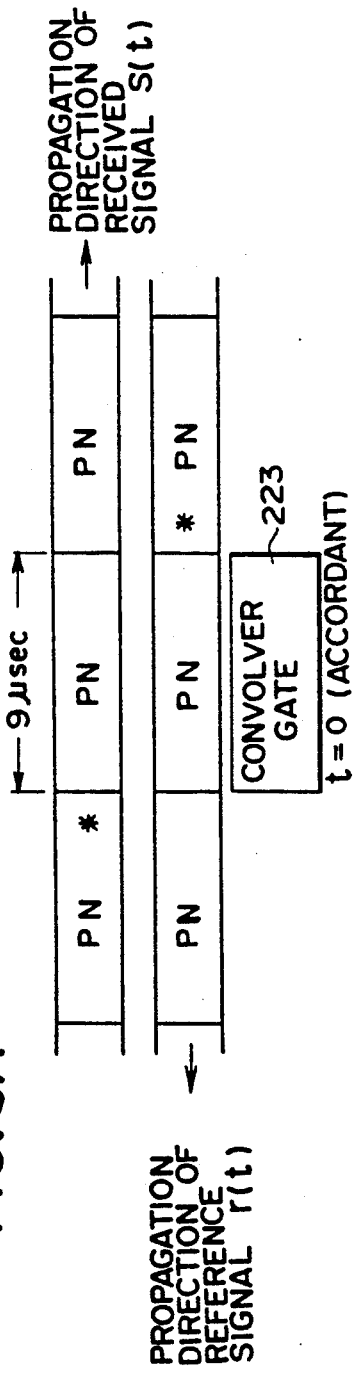
FIGS. 8A, 8B and 8C are conceptual diagrams for explaining the operation of the convolver.

The convolver 22 receiving the received signal FCS and the reference signal RS at an IN1 terminal and an IN2 terminal, respectively, generates a convolution output CONV at an OUT terminal thereof. More in detail, the convolver 22 can be an SAW convolver 22A having the construction indicated in FIG. 7 (221 and 222 being interdigital transducers IDT; 223 being a gate electrode; 224 being a zinc-oxide (ZnO) layer; 215 being a silicon oxide (SiO$_2$) layer; 226 being a silicon (Si) layer; and 227 being an ohmic electrode). At this time, denoting an ideal signal FCS received at the IN1 terminal, containing noise, by a function s(t) and similarly an ideal reference signal RS received at the IN2 terminal by a function r(t), the convolution output CONV at this time, i.e. a function c(t), is given by a following equation;

$$c(t) = \int \tau s(\tau) \cdot \Gamma(2t - \tau - T) d\tau$$

where T represents the processing time of the convolver, as described previously. Here supposing that the period T1 of the PN code is 9 μsec and the processing time T is also 9 μsec, since the PN codes are in accordance with each other at t=0, t=4.5 μsec and t=9 μsec, as indicated conceptually in FIG. 8A, 8B and 8C, a correlation output with a period Tcsp, i.e. great for every 4.5 μsec, can be obtained at the convolution output c(t), as indicated in FIG. 9. This is true in the case where s(t) and r(t) are continuous signals. On the contrary, in the case of a discontinuous signal as the burst portion according to the present invention, in order to obtain a correlation output, which is as great as that obtained for the continuous signal, it is necessary that the burst period TB is longer than 1.5 times of the processing time T of the convolver. (It has been already described that TB ≧ 1.5T is preferable).

Figure 10:
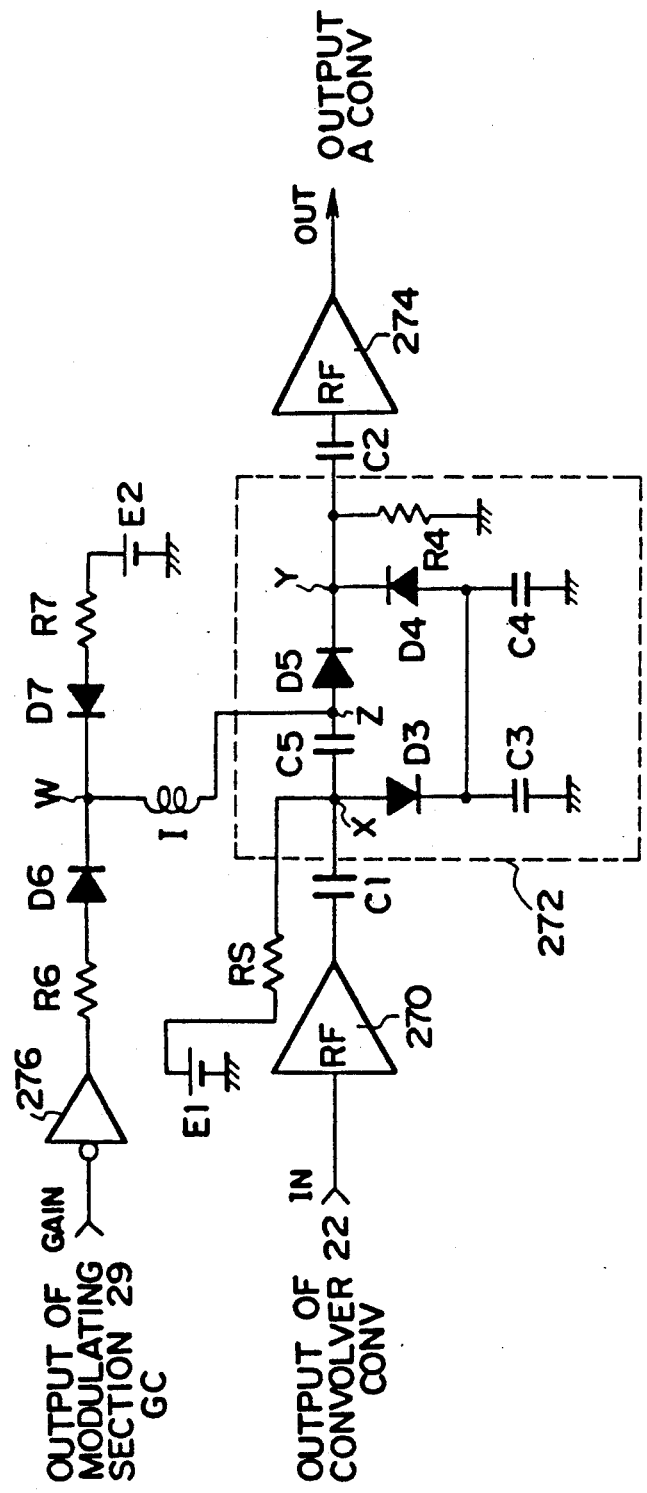
FIG. 10 is a circuit diagram showing in detail a circuit of a variable gain amplifier 27 in the receiver indicated in FIG. 1B.
Figure 11:
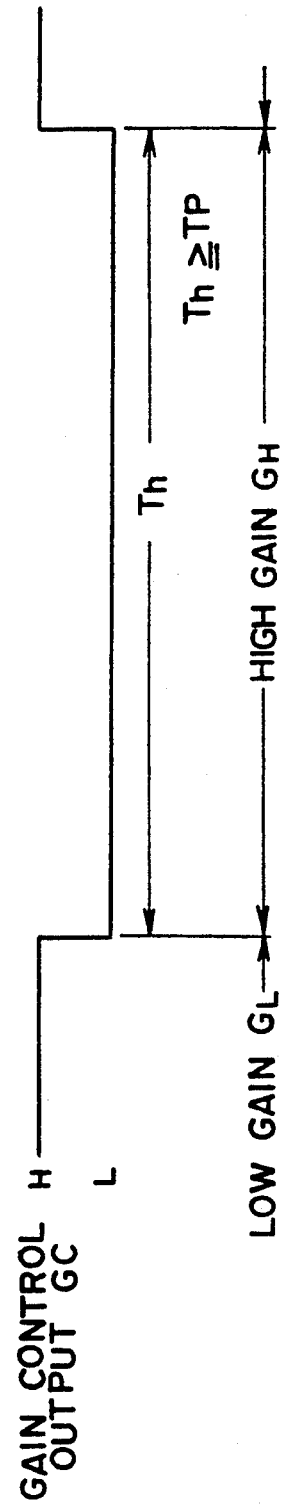
FIG. 11 show a waveform of a gain control signal GC, which is one of inputs, to the circuit indicated in FIG. 10.

Next the variable gain amplifier 27 receiving the convolution output CONV, as described above, will be explained, referring to FIGS. 10 and 11. This variable gain amplifier relates to one of the characteristics of the present invention. As indicated in FIG. 10, this variable gain amplifier 27 is provided with an RF amplifier 270 connected in series between the IN terminal and the OUT terminal; a capacitor Cl; a variable attenuator 272; a capacitor C2; and an RF amplifier 274. In the variable attenuator 272, as indicated in the figure, a point X is grounded through a forward direction diode D3 and a capacitor C3; a point Y is grounded through a reverse direction diode D4 and a capacitor C4 as well as a resistor R4 connected in parallel with them; and the point X is connected with the point Y through a capacitor C5 and a forward direction diode D5. Further the point X is connected with a fixed DC power supply E1 through a resistor R5. Furthermore a point Z is connected with a point W through a coil I and this point W is connected with a GAIN terminal through a reverse direction diode D6, a resistor R6 and an inverter 276. In addition the point W is grounded through a reverse direction diode D7, a resistor R7 and a fixed DC power supply E2.

In this circuit indicated in the figure, the variable attenuator 272 works so as to decrease the attenuation (increasing the gain of the amplifier 27), as the potential at the point W rises positively. Consequently, when it receives a gain control output GC (described later), as indicted in FIG. 11, at the GAIN terminal, during a period where the level is high, the drive path in the attenuator 272 is E2→R7→D7 and lowers the voltage at the point W to set a low gain $G_L$. On the contrary, during a period where the level is low, the drive path is 276→R6→D6 and raises the potential at the point W to set a high gain $G_H$. The magnitude of the gain thus set is determined by selecting the output voltage of the inverter 276, the voltage of the power supply E2 and resistances of the resistors R6 and R7. As the result, this variable gain amplifier 27 generates an output ACONV amplified with a variable gain of the output CONV at the OUT terminal.

Next the detecting circuit 28 receiving this output ACONV at the IN terminal will be explained, referring to FIGS. 12, 13, 14A and 14B. The detecting circuit 28 relates to the characteristics of the gain control according to the present invention and is provided, as indicated in detail in FIG. 12, with a double balanced modulator 280 receiving the output ACONV of the amplifier 27 at the two inputs; a band pass filter 282 receiving an output DBM thereof; an amplifier 284 receiving an output BPFO of this band pass filter; and a double balanced modulator 286 receiving the output of the amplifier at the two inputs thereof for the purpose of rectification. The waveform within this detecting circuit is indicted in FIG. 13 in an ideal state and in FIGS. 14A and 14B, in the case where CW disturbing signals are mixed therein in the antenna 20.

FIG. 13 shows the output ACONV in an ideal state, which is obtained by enlarging the waveform indicated in FIG. 9. It has a frequency component (which, in this case, contains no disturbing component) having a central frequency $f_0$ as indicated in FIG. 14B. Further $T_{CSW}$ is equal to the driving clock frequency for the PN code. Receiving this output, the modulator 280 generates the output DBM by squaring it. This output has a spectrum containing a doubled frequency component (the central frequency being $2f_0$), as indicated in FIG. 14B. As it can be seen from the output DBM' indicated in FIG. 14B, the correlation components between the CW disturbing signals and the reference signal RS are concentrated in the neighborhood of the direct current in the spectrum. On the contrary, the correlation components between the aimed signal component and the reference signal RS is distributed over a wide frequency band in the spectrum. The pass band $f_L$ to $f_H$ of the filter 282 is so selected that the lower frequency limit $f_L$ is higher than the CW disturbing components in the neighborhood of DC in the output DBM, and that the upper frequency limit $f_H$ is equal to the upper limit of the primary aimed component in the output DBM'. The output BPFO of this band pass filter 282 is rectified by the succeeding modulator 286 to produce the final detected output ADCONV indicated in FIG. 13.

Figure 14A:
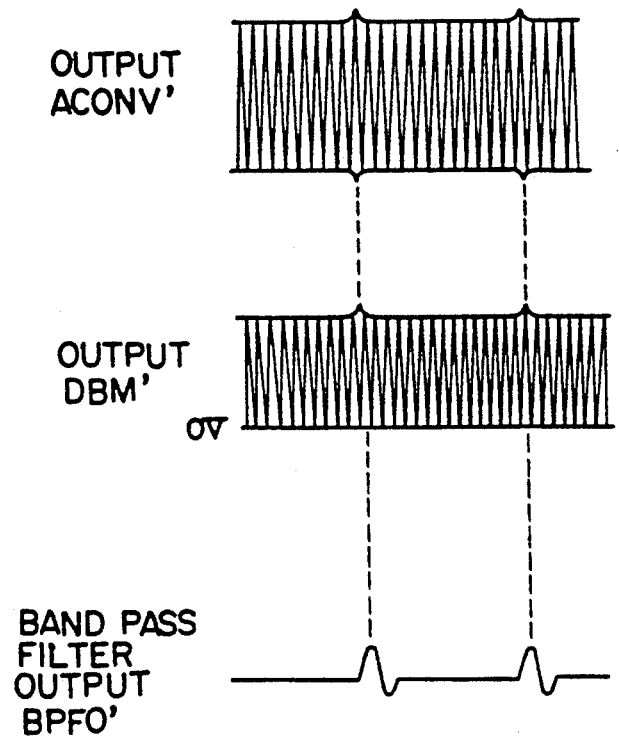
FIGS. 14A and 14B show waveforms appearing in the circuit indicated in FIG. 12, when CW disturbance takes place.
Figure 14B:
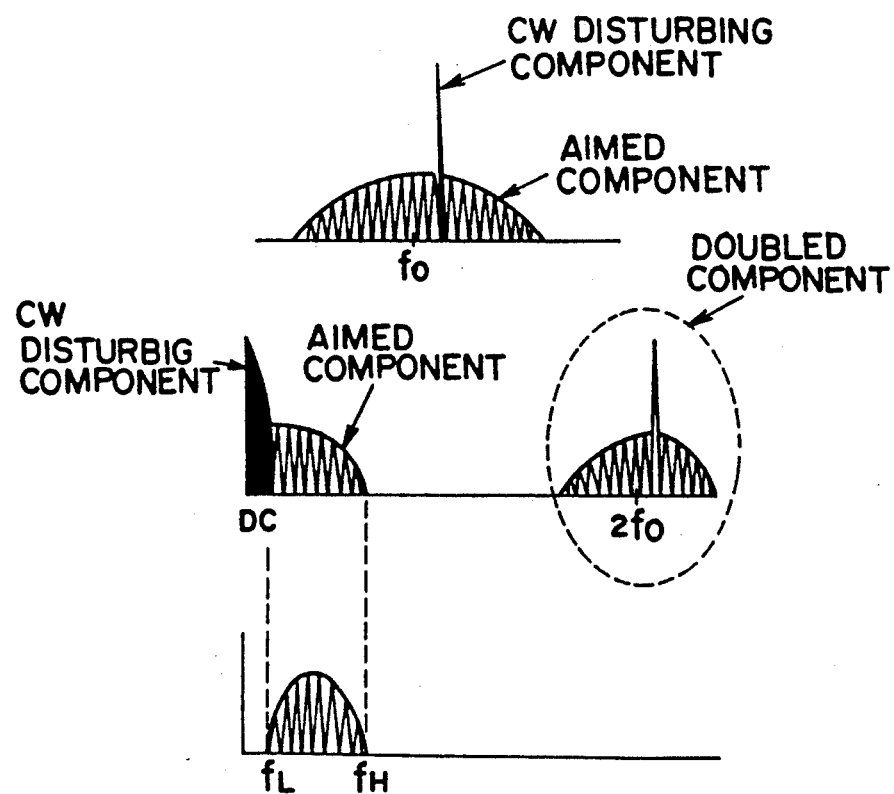

In the case where there is CW disturbance, the convolution output ADCONV is represented by ADCONV' indicated in FIGS. 14A and 14B and the output of the modulator 280 at this time is DBM'. At this time the majority of the CW disturbing components is eliminated from the output BPFO' of the band pass filter. (In the case where no special measures for suppressing the CW disturbance is required, the detecting circuit 28 may be a diode, which effects merely envelope detection.)

Figure 15:
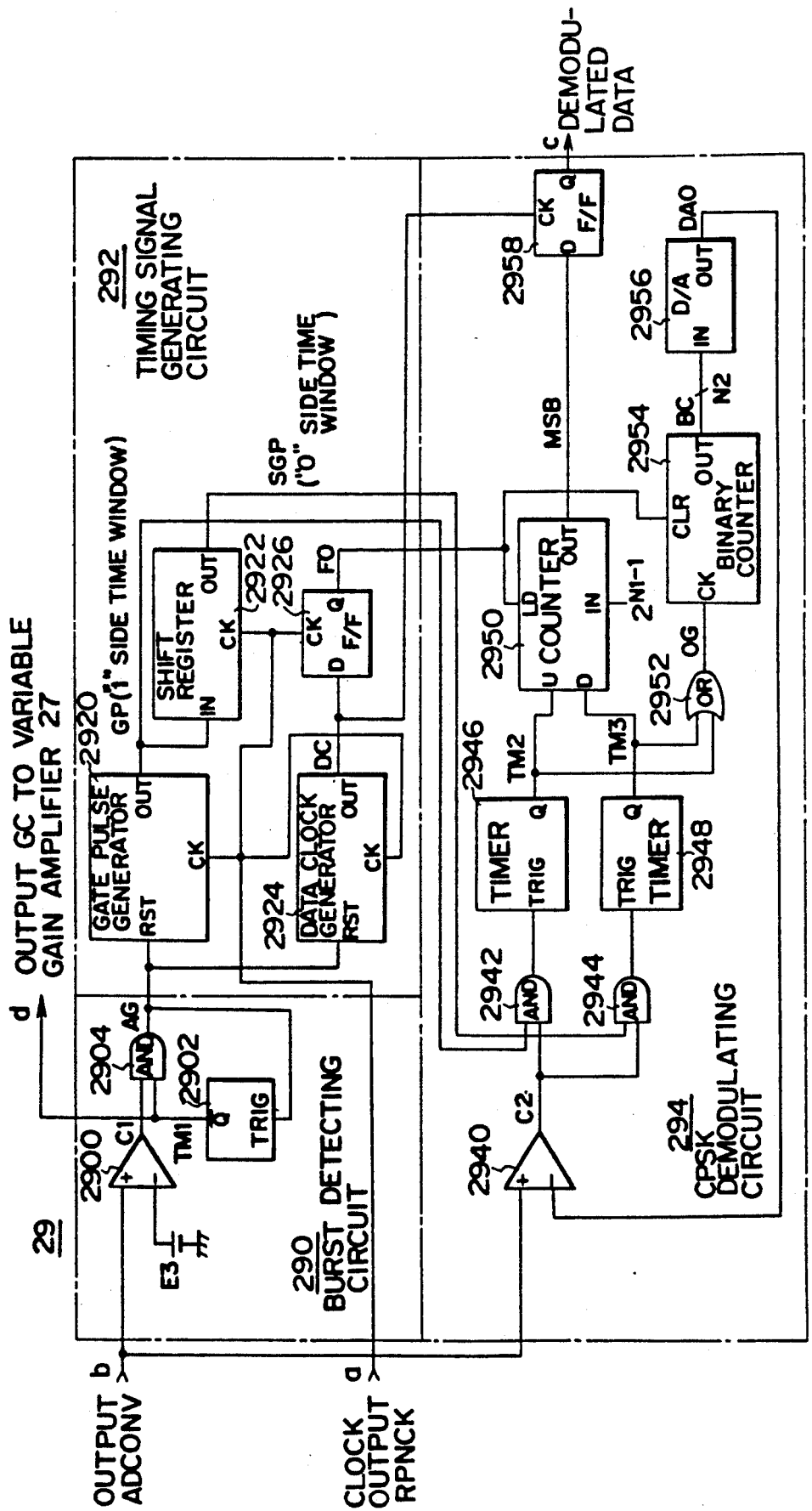
FIG. 15 is a circuit diagram showing in detail a circuit of a data demodulating section 47 in the receiver indicated in FIG. 1B.
Figure 16:
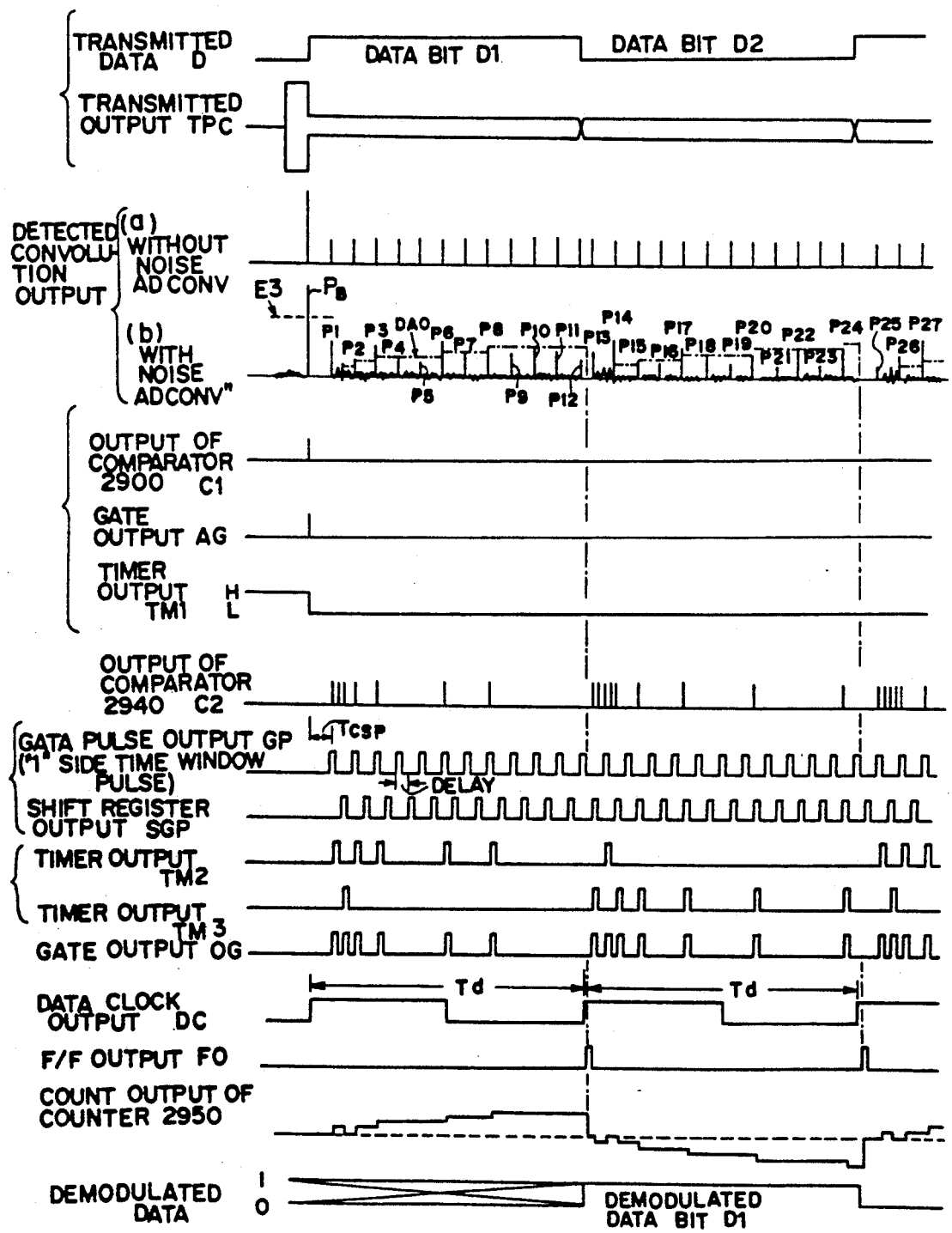
FIG. 16 shows waveforms at different parts in the circuit indicated in FIG. 15.

At last, the data demodulating section 29 effecting data demodulation from this detected output ADCONV will be explained, referring to FIGS. 15 and 16. The data demodulating section 29 receives the clock output RPNCK at an "a" terminal and the detected output ADCONV at a "b" terminal to output the demodulated data at a "c" terminal and the gain control signal GC at a "d" terminal. In detail, as indicated in FIG. 15, this circuit is composed of a burst detecting circuit 290 effecting burst detection, a timing signal generating circuit 292 generating timing signals used for various sorts of demodulations in synchronism with the burst thus detected and a CPSK demodulating circuit 294, roughly divided. FIG. 16 shows various sorts of waveforms in these circuits.

At first, the burst detecting circuit 290 is a part relating to the characteristics of the burst transmission and reception according to the present invention and includes a comparator 2900, which compares the convolution output ADCONV, which has been detected, (the time axis in FIG. 16 being compressed with respect to those used in FIGS. 13 and with a fixed threshold voltage E3 (indicated also in FIG. an AND gate 2904 and a timer 2902. The height of the threshold E3 used in the comparator 2900 is selected so as to be smaller than the convolution output produced by the burst portion, but greater than the convolution output produced by the data portion, i.e. $P_B$. In FIG. 16, an ideal output ADCONV containing no noise and an output ADCONV" containing noise are indicated. In the following description, explanation will be made for the latter output ADCONV" containing noise.

The comparator responding to the output ADCONV" generates an output C1 containing only pulses corresponding to a pulse $P_B$. The AND gate 2904 receiving this output C1 is constructed so as to receive an output TM1 of the Q* terminal of the timer 2902 as the other input. This timer makes the timer output TM1 usually high and low during a certain time Th, when a trigger input is received by a trigger terminal TRIG. This time Th is selected so as to be longer than the packet period TP. Consequently the gate output AG of the AND gate generates a pulse corresponding to the pulse $P_B$. At this time the timer output TM1 is made low during the time Th. During this time, Th, i.e. at least during this packet period TP, the AND gate obstructs pulses P1~P28.
.. succeeding the pulse $P_B$. In this way it is secured that only the burst portion acts as the time reference and the other part is not used as the time reference. The timer output TM1 is the gain control output GC indicated in FIG. 11.

The following timing signal generating circuit 292 is provided with a gate pulse generator 2920 and a shift register 2922 for forming two time window pulse trains; as well as a data clock generator 2924 and a D-type F/F 2926 for generating a signal indicating a duration of each data bit and a sampling clock for the demodulated data. The generator 2920 receives the gate output AG at a reset terminal RST and the clock output RPNCK at a CK terminal thereof to generate a pulse after a lapse of time $T_{CSP}$ measured from the rise of the gate output AG as the output GP and to generate repeatedly pulses thereafter with a period of $T_{CSP}$. These gate pulses, which are the output GP, function as "1" side time window pulses. Next, the shift register 2922 receiving the output GP at the IN terminal and the clock RPNCK at the CK terminal delays the gate pulse by a phase of 180° (which corresponds to a phase delay of 180° at the shift register indicated in FIG. 3 and to ½ of the delay time by the shift register 1300 as the delay time, because the time axis for the convolver output is compressed to ½ with respect to the timer axis for the input thereof). Consequently it generates a phase shift gate pulse output SGP at the OUT terminal. Pulses of this phase shift gate pulse output SGP function as "0" side time window pulses. Further the data clock generator 2924 receiving the gate output AG at the RST terminal and the clock RPNCK at the CK terminal outputs data clock outputs DC repeatedly at the OUT terminal with a period Td (the data clock period indicated in FIG. 2) after the rise of the pulse in the output AG. This output DC functions as a sampling clock for the demodulated data. The D-type F/F 2926 receiving this output at the D terminal and the clock output RPNCK at the CK terminal generates a pulse obtained by delaying the output DC by one period of the clock output RPNCK as an output FO. This output FO is used for initializing the circuit for the demodulation.

The synchronization by using the burst described above has an advantage as follows. Firstly, since certainty of the synchronization can be raised at need by increasing the transmission power for the burst portion with respect to the data portion, sure synchronization is made possible even in an environment, where noise/disturbance is intense. Further, in this way, it is possible to raise the disturbance excluding property up to the limit property of the data demodulation by the reception of the data portion. Secondly, since the burst period TB can be selected so as to be about as long as the processing time of the used correlator, it can be very short. For example, in the case of a convolver having a processing time of 9 μsec, the burst period can be 9 to 14.5 μsec. Consequently, in the case where packet transmission is effected, the transmission efficiency can be increased by shortening the part of previous processing and therefore it is suitable for a high speed transmission. Thirdly, since the burst portion can be extremely short, together with the spread spectrum modulation, although electric power is high, disturbance given to other communication is small. Fourthly, although the peak electric power of the burst portion is high, since the ratio of the transmission time therefor to that required for the data portion is small and thus increase in the average electric power is slight, low electric power consumption can be realized. Fifthly, since the peak electric power of the burst portion is high, carrier sense (to verify whether another station is effecting transmission or not, by carrying out previously reception before transmission, at constructing a wireless network, where a plurality of stations effect random access) is made easier.

Next the CPSK demodulating circuit 294 will be explained. This is one of the characteristics of the present invention and provided with a comparator 2940 receiving the detected output ADCONV (in the present explanation ADCONV") and comparing it with a threshold voltage DAO for converting input data into two-valued data (explained later); two AND gates 2942 and 2944; two timers 2946 and 2948; and a counter 2950. Further an OR gate 2952, a binary counter 2954 and a D/A converter 2956 constitute a sweep type threshold voltage control circuit for converting data into a two-valued signal, which varies the threshold voltage DAO. Owing to this circuit portion the threshold voltage has values increasing stepwise, as indicated in chain-dotted line on the output ADCONV" in FIG. 16

The comparator 2940 for converting data into a two-valued signal, which compares the input with such a threshold voltage DAO, generates two pulses due to noise components between two pulses P1 and P2 in addition to pulses corresponding to pulses P1, P2, P3, P6 and P8 in the data bit D1 section. In the data bit D2 section it outputs P13, P14, P15, P17, P20 and P24 as well as three pulses due to noise between P13 and P24. The AND gate 2942 receiving the output C2 of this comparator receives the "1" side time window pulse train GP as another input. On the other hand the AND gate receives that output C2 and the "0" side time window pulse train SGP and consequently the gates 2942 and 2944 act so as to send pulses of generation timings corresponding to data "1" and "0" to TRIG terminals of the succeeding timers 2946 and 2948, respectively. When these timers receive pulse inputs at the respective TRIG terminals, they keep the potentials at the respective Q terminals at a high level for a certain period of time. By the respective trigger inputs they continue to keep them further at the high level for the certain period of time. Further the length of that certain period of time is selected so as to be greater than the pulse width of each time window pulse and smaller than the period of the time window pulse so that only one pulse is outputted within each time window. As the result the timer outputs TM2 and TM3 of the different timers are as indicated in the figure.

Now the sweep type threshold voltage control circuit for converting data into a two-valued signal will be explained. As indicated in FIG. 6, the OR gate 2952 receiving the timer outputs TM2 and TM3 at the two inputs thereof generates the gate output OG including all the pulses within these timer outputs. The binary counter 2954 of N2 bits receiving this output OG at a CK terminal and the output FO at a clear terminal CLR generates an output BC obtained by counting the pulses. This count output BC is converted into an analogue value by the succeeding D/A converter 2956 to form the threshold voltage DAO. The aspect, with which this voltage DAO increases stepwise with increasing count, is as indicated in the figure. When a pulse is produced in the output FO at the end of each data bit section, the counter 2954 is cleared. As the result, the threshold voltage DAO is returned to zero volt.

By such a sweep of the threshold voltage from zero volt to the peak value of the correlation spike during the data period, since the different parts during each of the data bit periods are examined by using the different thresholds, an effect can be obtained that a substantially constant property can be obtained, independently of reception conditions. Consequently, comparing it with the case where this threshold is set at a certain fixed value, the judgment of the optimum level becomes unnecessary and even in the case where disturbance and noise are intense, it can be used in practice. Further, since the threshold voltage is swept stepwise only in one direction (in this example of explanation, in the positive direction), comparing it with the following type threshold control, there is no risk of oscillation and therefore it is suitable for high speed response. Furthermore, since the operation is independent for every data bit, it has an advantage that, even if the operation is unsuitable for a certain bit, this has no influences on the operation for the succeeding bits.

Next the counter 2950 of N1 bits and the D-type F/F 2958, which judge the state of each data bit on the basis of the numbers of pulses within the timer outputs TM2 and TM3, will be explained. In this part, the polarity of the difference between these numbers of pulses is used for judging the state "0" or "1" of the data bit (the absolute value of the difference having nothing to do). The counter 2950 receives the timer output TM2 at the up-count input U and the timer output TM3 at the down count input D and in addition fixed input data, i.e. $2^{N1-1}$(if N1=8, this being 128, i.e. in the binary representation 10000000) at the IN terminal and the output FO at the load terminal LD so as to output the most significant bit MSB at the OUT terminal. Therefore, in the case where the difference obtained by subtracting the number of pulses within the timer output TM3 from the number of pulses within the timer output TM2 in each data bit is positive, the most significant bit MSB is the state "1" and the data bit at that time is interpreted to be "1". On the contrary, in the case where the difference is negative, the data bit is interpreted to be "0". This MSB output is sampled by the output DC in the succeeding D-type F/F to produce the demodulated data. The output FO becomes high immediately after the sampling clock DC so that fixed input data are read into the counter 2950. The operation described above is repeated for the succeeding bit.

Further, in the example described above, the fixed input data can be changed from the value stated above of $2^{N1-1}$ to $2^{n1}-1$ or it can be changed further for the last value to another in a region, where efficient use of the count range is not prevented.

The CPSK modulation-demodulation by the CPSK demodulation explained above and the CPSK modulation stated above has an advantage as described below. Firstly, since the correlation pulse is selectively extracted by using two kinds of time window pulses, noise or disturbance, which can exist in a period of time outside of the time windows, is not caught and thus the effect of suppressing noise/disturbance is remarkable. Further, owing to the type of processing, where the correlation output doesn't disappear in principle, the noise/disturbance suppressing effect can be efficient by adding correlation outputs (adding operation by means of a counter). Secondly, owing to the type of processing, where the polarity of the difference between the numbers of the two kinds of correlation pulses, which have passed through those two time windows, is made correspond to the state of the demodulated data, the data demodulation is substantially independent of the absolute value of the correlation pulses and hardly influenced by circuits outside of the demodulation section. Therefore the stability of the data demodulation is increased. Further, since any tracking loop as used heretofore is not used, there is no fear of oscillation.

Now the operation of the variable gain amplifier 27 indicated in FIG. 10, receiving the gain control signal GC (indicated in FIGS. 16 and 11) of the demodulating section 29, which has been explained just above, will be explained. At it can be seen from FIG. 16, the gain control signal GC is high and sets the amplifier 27 at a low gain $G_L$ in the period other than the packet period TP and in the burst period TB of the packet, i.e. in the period, where the burst portion is waited, so that noise, etc. are not detected, erroneously judging them to be a burst portion. On the other hand, the signal GC is low and sets the amplifier 27 at a high gain $G_H$ during a period of time of Th after the detection of the burst portion, i.e. at least in the data period TD. In this way the data portion having a low transmission power (e.g. 1/100 of electric power for the burst portion: 10 $\mu$W/1 mW) can be surely detected, even in the case where disturbance, etc. are intense. For such a gain control, it is not necessary to effect any negative feedback control of the output of the correlator as required by the prior art technique.

Figure 12:
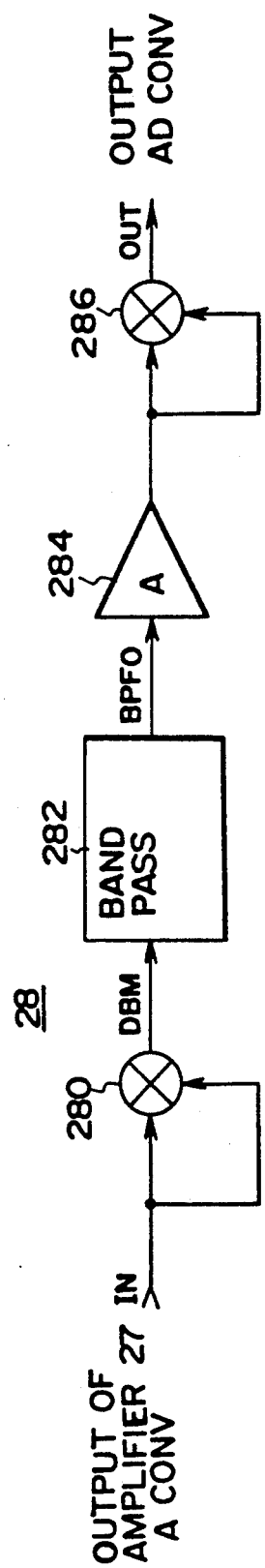
FIG. 12 is a circuit diagram showing in detail a circuit of a detecting circuit 28 in the receiver indicated in FIG. 1B.

Such a gain control is desirable specifically, in the case where a detecting circuit as indicated in FIG. 12 is used. This is because the detecting circuit 28 is useful against CW disturbance but noise is contained abundantly, when S/N of the input of the receiver is small (i.e. in the case where noise is intense), and at this time, when the gain control stated above is used, it is possible to prevent erroneous operation due to noise in the output of the detecting circuit.

In the example indicated in the fire, the amplifier 27, which is on the output side of the convolver 22, is controlled by the gain control signal GC. However, instead thereof, the RF/IF section 21 can be controlled in the gain, as indicated by a broken line 30 in FIG. 1B.

Although in the receiver 2 explained above, an example, in which a convolver is used for the correlator, has been explained, a matched filter having fixed sign or a digital correlator can be used for the correlator. The matched filter, which is the former, is one, in which the pattern of the interdigital electrodes is made in accordance with the pattern of the used PN code; the frequencies of the input and the output thereof are equal to each other; and the time axis doesn't vary. The digital correlator, which is the latter, is one, in which the operation of the matched filter is constructed by using digital circuits. Although operations are effected in the base band, it can realize an operation equivalent to that of the matched filter.

Application of the burst transmission/reception to other systems

The burst transmission/reception explained above can be applied also to the method, by which the phase of the PN code of the reference signal is synchronized, as described in Literature 1 (JP-B-Sho 64-11178). At this time the timing signal obtained from the received burst signal can be used for the phase synchronization therefor.

The reason why such a phase synchronization is necessary will be explained, referring to FIGS. 17A and 17B. In the case where a convolver is used for the correlator, when the period T1 of the PN code is approximately equal to the smallest width of the data, i.e. the data clock period Td, the phase synchronization between the PN code of the received signal and the PN code of the reference signal on the receiver side is necessary. (In the case where T1<Td, such a phase synchronization is unnecessary.) FIG. 17A shows the state of a correct phase synchronization among the received signal, the reference signal, and the gate electrode of the convolver. (+PN indicates a PN code corresponding to data "1", while −PN indicates a PN code corresponding to data "0".) At this time the greatest correlation output can be obtained. On the other hand, FIG. 17B indicates a case where the phases of the two signals are in accordance with each other, but they are deviated from the gate electrode. In this case the correlation output decreases and therefore this is not preferable.

This is the reason why the phase synchronization is necessary.

Figure 8B:
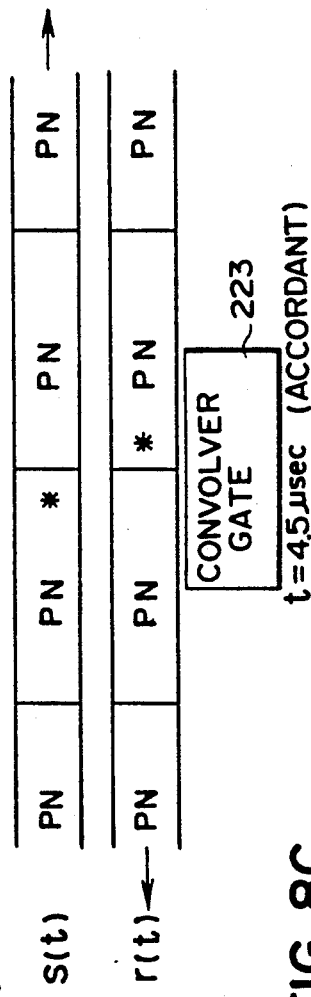
Figure 8C:
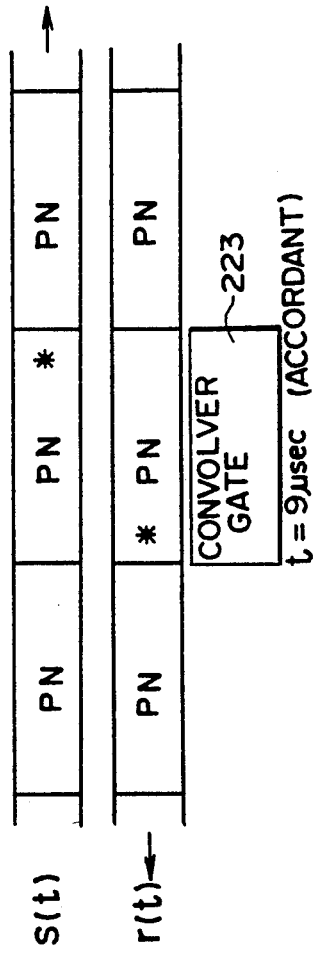
Figure 18C:
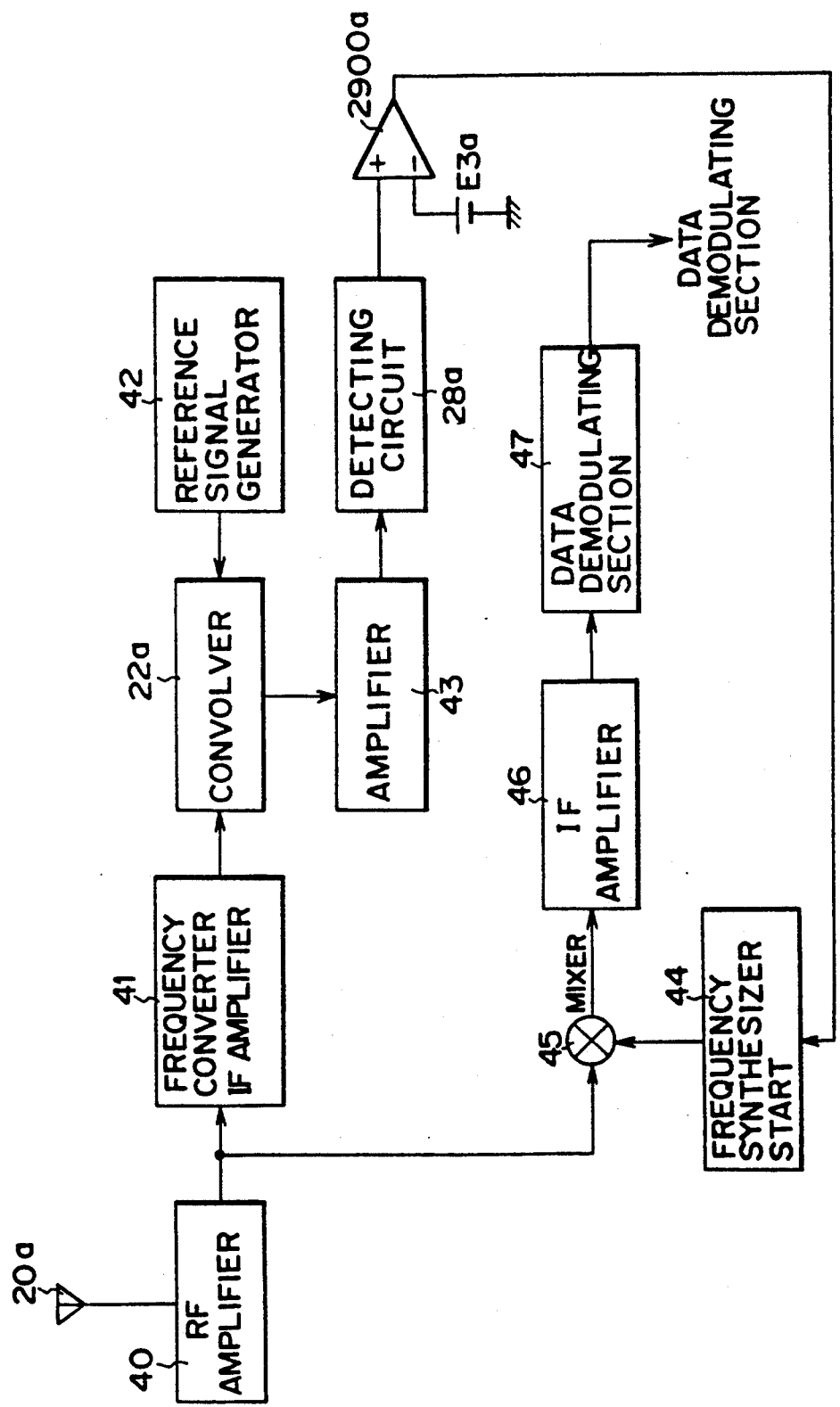

Further, the burst transmission/reception according to the present invention can be used for the spread spectrum modulation communication not only by the direct sequence (DS) system but also by the frequency hopping (FH) system. By this FH system, as indicated in FIG. 18A, data are transmitted while changing over the transmission frequency with a high speed as $f_1$, $f_2$, $f_3$ ... On the receiver side, the data are received by changing over the reception frequency in synchronism with the change-over of the transmission frequency. Also by this system the synchronization control of the received signal is inevitable. Consequently, as indicated in FIG. 18A, transmission of the burst portion BP by the DS system is effected at the beginning of a transmission packet and a frequency hopping signal FH is transmitted by using this burst transmission as the time reference. On the other hand, on the receiver side, as indicated in FIG. 8B, the hopping frequency of the frequency synthesizer within the receiver is controlled by using the correlation pulse output PP obtained by receiving the burst portion BP to synchronize the reception frequency with the transmission frequency. FIG. 18C is a block diagram of a receiver 4 effecting such an operation. (The parts analogous to those indicated in the receiver 2 in FIG. 1B are indicated by same reference numerals, to which "a" is added.) As it is seen from the figure, it is so constructed that a correlation pulse PP outputted by the comparator 2900a as a comparison result with the threshold voltage E3a is inputted to a start terminal START of the frequency synthesizer 44. When this is inputted therein, the synthesizer 44 begins the frequency hopping, starting from a predetermined frequency ($f_1$ in this example). The mixer 45, the IF amplifier 46 and the data demodulating section 47 receiving the output of this synthesizer and the output of the RF amplifier 40 are identical to those used by the prior art technique.

Further the synchronization by the burst according to the present invention can be applied to all other sorts of synchronizing operation (including synchronization such as synchronization of the time windows for the CPSK-demodulation described previously) in a receiver for the spread spectrum modulation communication.

According to the present invention explained above in detail, various effects such as remarkable effect of suppressing noise/disturbance, high speed transmission, small disturbance to other communication, low electric power consumption, possibility of carrier sense, etc. can be obtained by the burst transmission/reception. Further, by the gain control and the CPSK modulation-demodulation according to the present invention, an effect can be obtained that the system is strong against noise/disturbance and a high stability is obtained.

What is claimed is:

1. A spread spectrum communication method for communicating data by spreading the spectrum thereof, comprising:

A) on the transmitter side:
    a) a step of generating a spread-spectrum-modulated output including a first modulated output portion which is spread-spectrum-modulated and contains no data to be transmitted and a second modulated output portion which is spread-spectrum-modulated, follows said first modulated output portion, and contains data to be transmitted; and b) a step of transmitting said spread-spectrum-modulated output so as to transmit said second modulated output portion with a low electric power and said first modulated output portion with a high electric power; and B) on the receiver side:

a) a step of correlation-demodulating a received input to generate a correlation-demodulated output which includes a first correlation-demodulated output portion corresponding to said first modulated output portion and a second correlation-demodulated output portion corresponding to said second modulated output portion;

b) a step of detecting from said correlation-demodulated output said first correlation-demodulated output portion, wherein only a portion of said correlation-demodulated output exceeding a predetermined threshold is detected as said first correlation-demodulated output portion; and c) a step of generating a timing signal serving as a reference for an operation on the receiver side, starting from said first correlation-demodulated output portion.

2. A method according to claim 1, wherein said operation on the receiver side includes the step of using said timing signal for demodulating said transmitted data from said second modulated output portion.

3. A method according to claim 1, wherein a period of said first modulated output portion is shorter than a period of said second modulated output portion.

4. A method according to claim 1, wherein said spread spectrum modulation is of direct sequence type.

5. A method according to claim 4 wherein said direct sequence type spread spectrum modulation is CPSK modulation.

6. A method according to claim 1, wherein said spread spectrum modulation is of frequency hopping type.

7. A spread spectrum communication device for communicating data by spreading the spectrum thereof, comprising:

A) a transmitter which includes:

a) period specifying means for determining a packet period which includes a burst period containing no data to be transmitted and a data period following said burst period and containing data to be transmitted;

b) PN code train generating means for generating a PN code train which includes a repetition of first PN codes with a predetermined period;

c) modulating signal generating means for generating a modulating signal which includes said data to be transmitted during said data period and includes no data during said burst period;

d) spread-spectrum-modulating means for generating a spread-spectrum-modulated output by spread-spectrum-modulating said PN code train with said modulating signal;

e) transmission power specifying means for generating a transmission power specifying signal which specifies a high transmission power during said burst period and a low transmission power during said data period; and f) transmission power control means for transmitting said spread-spectrum-modulated output with an electric power corresponding to said transmission power specifying signal; and B) a receiver which includes:

a) means for obtaining a frequency-converted output by frequency-converting a received input;

b) correlator means for generating a correlation output from said frequency-converted output by using a PN code train which includes a repetition of second PN codes inverted in time with respect to said first PN code;

c) burst detecting means for comparing said correlation output with a predetermined threshold and for generating a timing signal when said correlation output is greater than said predetermined threshold, said predetermined threshold being lower than a level of said correlation output during said burst period but higher than the level of said correlation output during said data period; and d) data demodulating means for demodulating said correlation output by using said timing signal as a time reference.

8. A device according to claim 7 wherein said burst period is shorter than said data period.

9. A spread spectrum communication device for communicating data by spreading the spectrum thereof, comprising:

A) a transmitter which includes:

a) period specifying means for determining a packet period which includes a burst period containing no data to be transmitted and a data period following said burst period and containing data to be transmitted;

b) PN code train generating means for generating a PN code train which includes a repetition of first PN codes with a predetermined period;

c) modulating signal generating means for generating a modulating signal which includes said data to be transmitted during said data period and includes no data during said burst period;

d) spread-spectrum-modulating means for generating a spread-spectrum-modulated output by spread-spectrum-modulating said PN code train with said modulating signal;

e) transmission power specifying means for generating a transmission power specifying signal which specifies a high transmission power during said burst period and a low transmission power during said data period; and f) transmission power control means for transmitting said spread-spectrum-modulated output with an electric power corresponding to said transmission power specifying signal; and B) a receiver which includes:

a) means for obtaining a frequency-converted output by frequency-converting a received input;

b) correlator means for generating a correlation output from said frequency-converted output by using a PN code train which includes a repetition of second PN codes inverted in time with respect to said first PN code;

c) burst detecting means for comparing said correlation output with a predetermined threshold and for generating a timing signal when said correlation output is greater than said predetermined threshold, said predetermined threshold being lower than a level of said correlation output during said burst period but higher than the level of said correlation output during said data period; and d) data demodulating means for demodulating said correlation output by using said timing signal as a time reference wherein said transmission power control means includes:

a) a first transformer receiving said spread-spectrum-modulated output by a primary winding thereof and said transmission power specifying signal by a center tap of a secondary winding thereof; and b) a second transformer including a primary winding with two extremities which are connected with two extremities of said second winding of said first transformer through two diodes, respectively, and whose center tap is grounded, and a secondary winding for generating an output.

10. A device according to claim 7, wherein said spread-spectrum-modulating means effects direct sequence type spread spectrum modulation.

11. A device according to claim 10 wherein said direct sequence type spread-spectrum-modulation is CPSK modulation.

12. A device according to claim 8 wherein said spread-spectrum-modulating means effects frequency hopping type spread spectrum modulation.

* * * * *